United States Patent
Lou et al.

(10) Patent No.: US 10,932,184 B2
(45) Date of Patent: Feb. 23, 2021

(54) MULTI-CHANNEL SETUP MECHANISMS AND WAVEFORM DESIGNS FOR MILLIMETER WAVE (MMW) SYSTEMS

(71) Applicant: INTERDIGITAL PATENT HOLDINGS, INC., Wilmington, DE (US)

(72) Inventors: Hanqing Lou, Syosset, NY (US); Alphan Sahin, Westbury, NY (US); Oghenekome Oteri, San Diego, CA (US); Rui Yang, Greenlawn, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/330,227

(22) PCT Filed: Sep. 8, 2017

(86) PCT No.: PCT/US2017/050772
§ 371 (c)(1),
(2) Date: Mar. 4, 2019

(87) PCT Pub. No.: WO2018/049224
PCT Pub. Date: Mar. 15, 2018

(65) Prior Publication Data
US 2019/0208463 A1    Jul. 4, 2019

Related U.S. Application Data

(60) Provisional application No. 62/384,994, filed on Sep. 8, 2016.

(51) Int. Cl.
*H04W 48/12* (2009.01)
*H04W 72/04* (2009.01)
(Continued)

(52) U.S. Cl.
CPC .......... *H04W 48/12* (2013.01); *H04B 7/0413* (2013.01); *H04L 5/0032* (2013.01);
(Continued)

(58) Field of Classification Search
CPC . H04W 48/12; H04W 72/0426; H04W 48/16; H04W 72/0453; H04W 52/0209;
(Continued)

(56) References Cited

U.S. PATENT DOCUMENTS

2005/0124294 A1* 6/2005 Wentink ............ H04W 72/1263
455/41.2
2006/0072492 A1* 4/2006 Trainin ............. H04W 74/0816
370/328

(Continued)

FOREIGN PATENT DOCUMENTS

| EP | 2 574 125 | 3/2013 |
|---|---|---|
| WO | 2015185878 A1 | 12/2015 |

(Continued)

OTHER PUBLICATIONS

Agilent Technologies, "Wireless LAN and 60 GHz—IEEE 802.11ad Explained," pp. 1-28 (May 20, 2013).

(Continued)

*Primary Examiner* — Jung Liu
(74) *Attorney, Agent, or Firm* — Volpe Koenig

(57) ABSTRACT

Mechanisms may be used for multi-channel (MC) setup and access and waveform designs for millimeter wave (mmW) systems. An access point (AP) that is part of a basic service set (BSS) may provide multi-channel (MC) access to one or more stations (STAs) in the BSS. The AP may monitor for beacon frames transmitted by other access point/personal basic service set (PBSS) control point (AP/PCP) associated with overlapping basic service sets (OBSSs). The monitored beacon frames may include service period (SP) scheduling
(Continued)

information for the OBSS. The AP may generate an allocations at least one SPs and/or contention based access periods (CBAPs) channels to be used in a beacon interval in consideration of the SP scheduling information for the OBSS. The AP may transmit a beacon frame STA(s) indicating the SP/CBAP allocations. Other mechanisms may include simultaneous transmission of multiple single carrier (SC) waveforms with non-overlapping waveforms to multiple STAs.

20 Claims, 19 Drawing Sheets

(51) Int. Cl.
  *H04B 7/0413* (2017.01)
  *H04L 5/00* (2006.01)
  *H04W 48/16* (2009.01)

(52) U.S. Cl.
  CPC ....... *H04W 48/16* (2013.01); *H04W 72/0426* (2013.01); *H04W 72/0453* (2013.01)

(58) Field of Classification Search
  CPC .............. H04W 40/244; H04W 40/005; H04B 7/0413; H04B 7/0452; H04L 5/0032; H04L 27/2601; H04J 11/00; Y02D 70/142; Y02D 70/00; Y02D 70/168; Y02D 70/22; Y02D 70/26; Y02D 70/144
  See application file for complete search history.

(56) References Cited

U.S. PATENT DOCUMENTS

| | | |
|---|---|---|
| 2009/0147768 A1 | 6/2009 | Ji et al. |
| 2010/0304772 A1 | 12/2010 | Wang et al. |
| 2011/0199966 A1 | 8/2011 | Cordeiro et al. |
| 2011/0299509 A1 | 12/2011 | Wang et al. |
| 2014/0198785 A1 | 7/2014 | Awatere et al. |
| 2015/0063327 A1 | 3/2015 | Barriac et al. |
| 2015/0163769 A1 | 6/2015 | Lee et al. |
| 2016/0007234 A1 | 1/2016 | Li |
| 2016/0191409 A1 | 6/2016 | Li |
| 2016/0316375 A1* | 10/2016 | Li .................... H04W 74/0816 |
| 2016/0330684 A1* | 11/2016 | Sinha .................. H04W 40/244 |
| 2017/0126363 A1 | 5/2017 | Wang et al. |
| 2017/0223587 A1* | 8/2017 | Trainin ................. H04W 12/06 |
| 2019/0014580 A1* | 1/2019 | Cariou ................. H04W 72/08 |
| 2019/0349782 A1* | 11/2019 | Kim ..................... H04B 7/0695 |

FOREIGN PATENT DOCUMENTS

| | | |
|---|---|---|
| WO | 2017/156315 | 9/2017 |
| WO | 2017/197189 | 11/2017 |

OTHER PUBLICATIONS

Cariou et al., "Bandwidth signaling for EDMG," 802.11-16/054r0 (Jul. 25, 2016).
Cariou et al., "Preliminary design of EDMG PHY headers," 802.11-16/1046r0 (Jul. 28, 2016).
Chen et al., "MAC and PHY Proposal for 802.11af," IEEE 802.11-10/0258r0 (Mar. 2010).
Cordeiro, "Specification Framework for TGay," IEEE P802.11 Wireless LANs, IEEE 802.11-15/1358r4 (Jun. 13, 2016).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.0 (May 2011).
Draft Standard for Information Technology—Telecommunications and Information Exchange Between Systems—Local and Metropolitan Area Networks—Specific Requirements—Part 11: Wireless LAN Medium Access Channel (MAC) and Physical Layer (PHY) Specifications—Amendment 7: Enhanced throughput for operation in license-exempt bands above 45 GHz, IEEE P802.11ay/D0.2 (Jan. 2017).
Halasz, "Sub 1 GHz license-exempt PAR and 5C," IEEE P802.11 Wireless LANs, IEEE 802.11-10/0001r13 (Jul. 2010).
Huang et al., "Scheduling Allocation on Multi-channels in 11ay," IEEE 802.11-16/1208r0 (Sep. 13, 2016.
IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).
IEEE P802.11ah/D9.0, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah/D9.0 (Aug. 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah-2016 (Dec. 7, 2016).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
Kasher et al., "EDMG Header Encoding and Modulation," IEEE 802.11-16/1011r1 (Jul. 26, 2016).
Lomayev et al., "EDMG Header-B Encoding and Modulation for SC PHY in 11ay," IEEE 802.11-16/0989r0 (Jul. 25, 2016).
Lomayev et al., "EDMG STF and CEF Design for SC PHY in 11ay," IEEE 802.11-16/0994r1 (Jul. 27, 2016).
Lomayev et al., "Non-EDMG Part of Preamble for MIMO in 11ay," IEEE 802.11-16/XXXXr0 (IEEE 802.11-16/0988r0) (Jul. 25, 2016).
Maltsev et al., "Channel Models for IEEE 802.11ay," P802.11 Wireless LANs, IEEE 802.11-15/1150r4 (Sep. 12, 2015).
Sun et al., "IEEE 802.11 TGay Use Cases," IEEE 802.11-2015/0625r2 (May 2015).
Yang et al., "On the Single Carrier Waveforms for 11ay," IEEE 802.11-16/1455r0 (Nov. 7, 2016).

(56) References Cited

OTHER PUBLICATIONS

Yang et al., "Performance Evaluation of Multi-DFT-spread OFDM for 802.11ay," IEEE 802.11-17/0048r00 (Jan. 16, 2017).

* cited by examiner

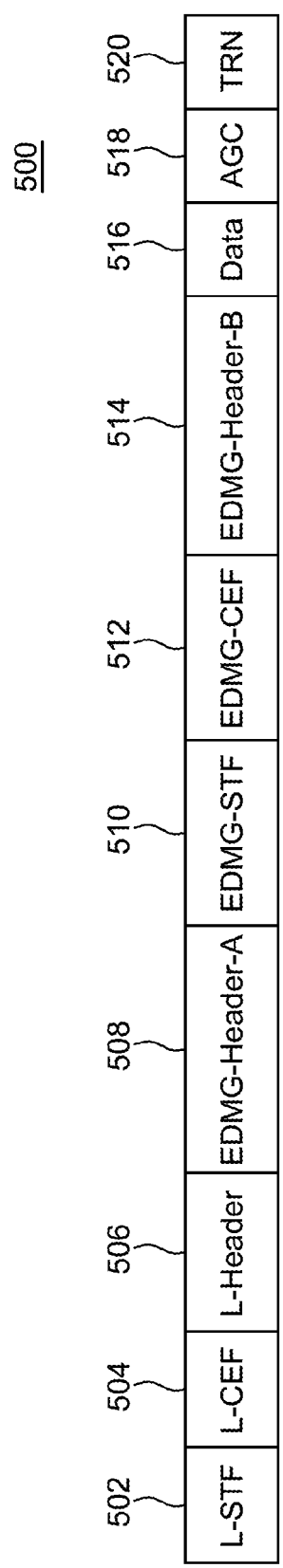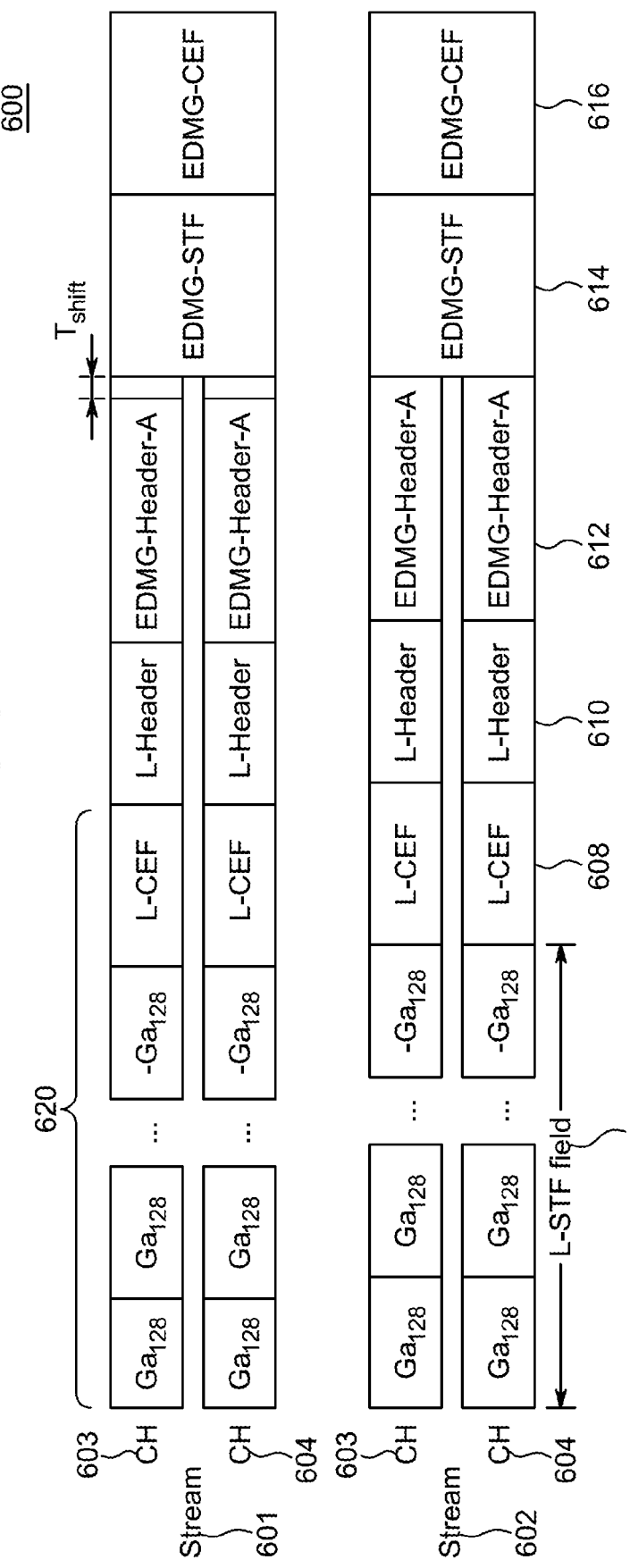
FIG. 5
FIG. 6

US 10,932,184 B2

MULTI-CHANNEL SETUP MECHANISMS AND WAVEFORM DESIGNS FOR MILLIMETER WAVE (MMW) SYSTEMS

CROSS REFERENCE TO RELATED APPLICATIONS

This application is the U.S. National Stage, under 35 U.S.C. § 371, of International Application No. PCT/US2017/050772 filed Sep. 8, 2017, which claims the benefit of U.S. Provisional Application No. 62/384,994, filed Sep. 8, 2016, the contents of which are hereby incorporated by reference herein.

SUMMARY

Mechanisms may be used for multi-channel (MC) setup and access and waveform designs for millimeter wave (mmW) systems. An access point (AP) that is part of a basic service set (BSS) may provide multi-channel (MC) access to one or more stations (STAs) in the BSS. The AP may monitor for beacon frames transmitted by other access point/personal basic service set (PBSS) control point (AP/PCP) associated with overlapping basic service sets (OBSSs). The monitored beacon frames may include service period (SP) scheduling information for the OBSS. The AP may generate an allocations at least one SPs and/or contention based access periods (CBAPs) channels to be used in a beacon interval in consideration of the SP scheduling information for the OBSS. The AP may transmit a beacon frame STA(s) indicating the SP/CBAP allocations. Other mechanisms may include simultaneous transmission of multiple single carrier (SC) waveforms with non-overlapping waveforms to multiple STAs.

BRIEF DESCRIPTION OF THE DRAWINGS

A more detailed understanding may be had from the following description, given by way of example in conjunction with the accompanying drawings wherein:

FIG. 5 is an example enhanced direction multi-gigabit (EDMG) preamble format;

FIG. 6 is an example multi-stream transmission scheme of EDMG preambles;

DETAILED DESCRIPTION

Figure 1A:
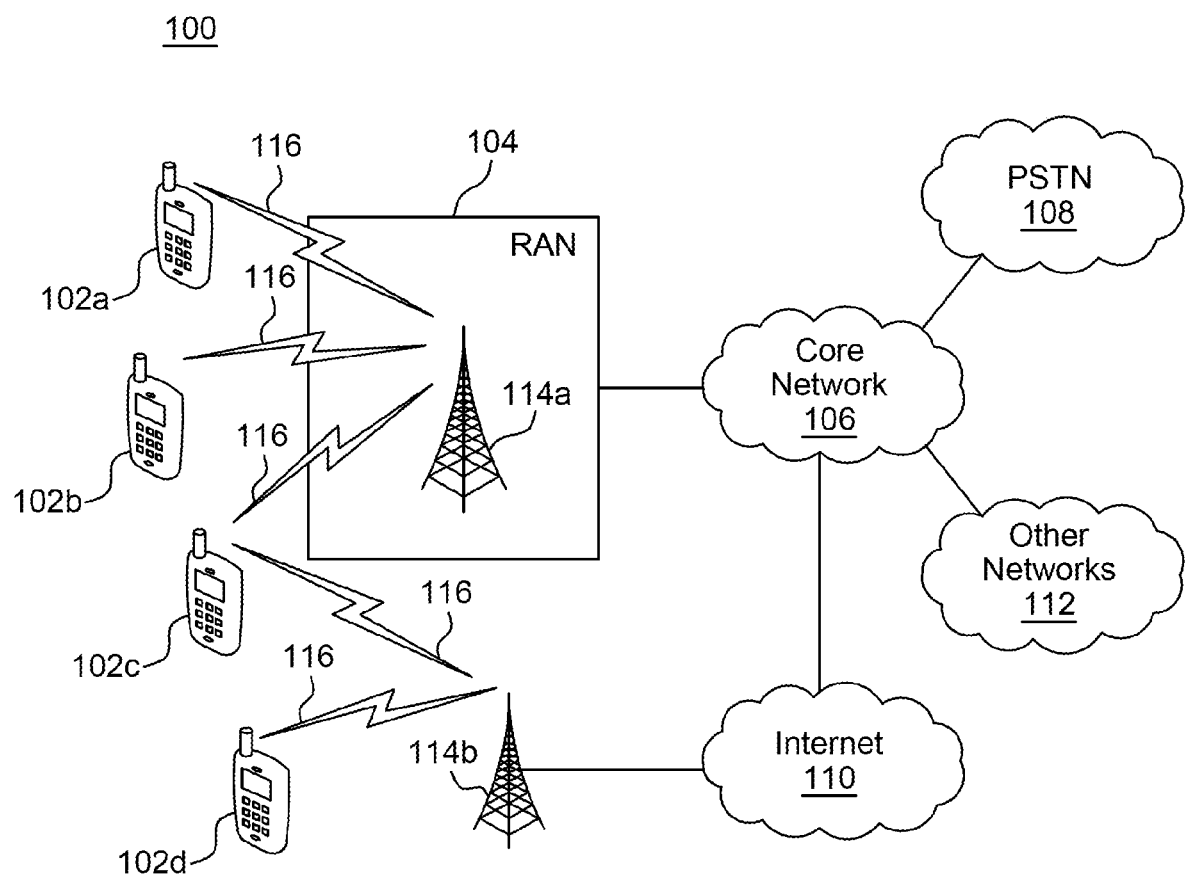
FIG. 1A is a system diagram of an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread orthogonal frequency division multiplexing (ZT-UW-DFT-S-OFDM), unique word OFDM (UW-OFDM), resource block-filtered OFDM, filter bank multi-carrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B (NB), an eNode B (eNB), a Home Node B (HNB), a Home eNode B (HeNB), a next generation Node B such as a gNode B (gNB), a new radio (NR) Node B, a site controller, an access point (AP), a personal basic service set (PBSS) control point (PCP), personal basic service set (PBSS) control point (PCP)/access point (AP), a station (STA) that is at least one of a PCP or an AP (PCP/AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like.

For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 Evolution Data Only/Evolution Data Optimized (EV-DO), Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
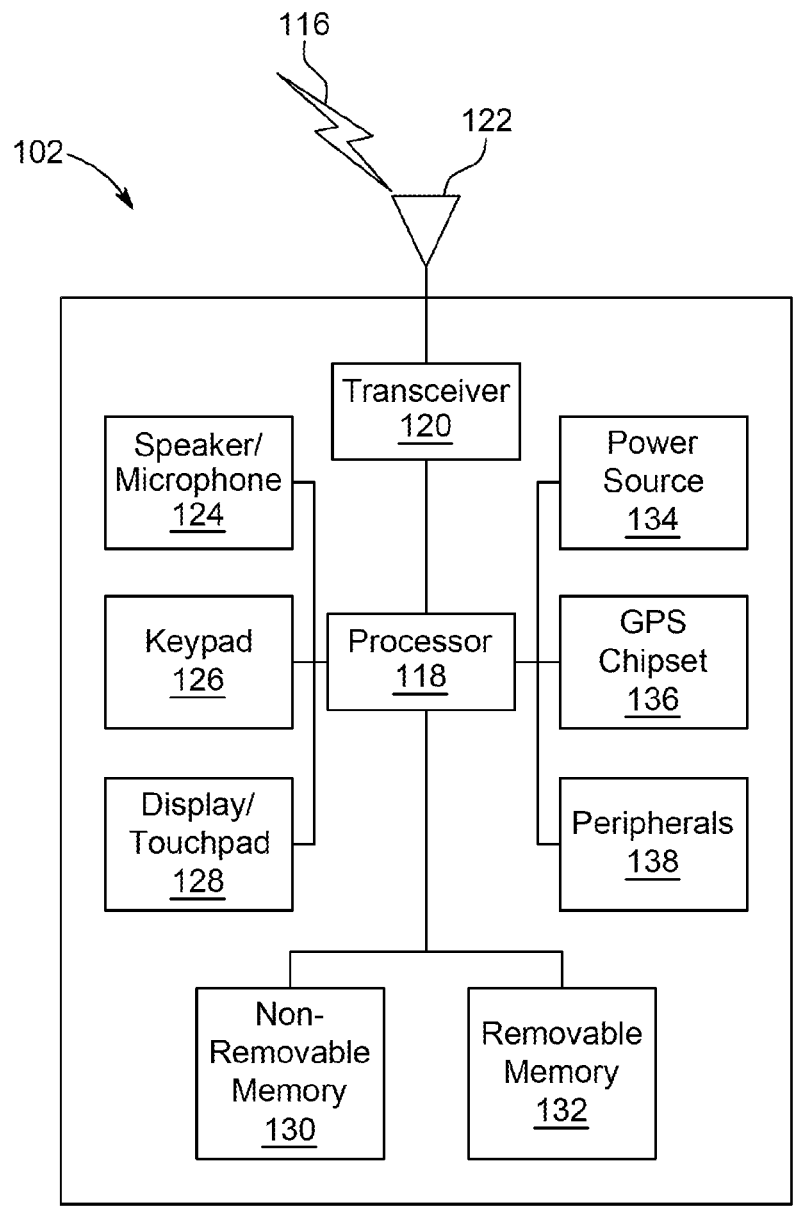
FIG. 1B is a system diagram of an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the uplink (UL) (e.g., for transmission) and downlink (DL) (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
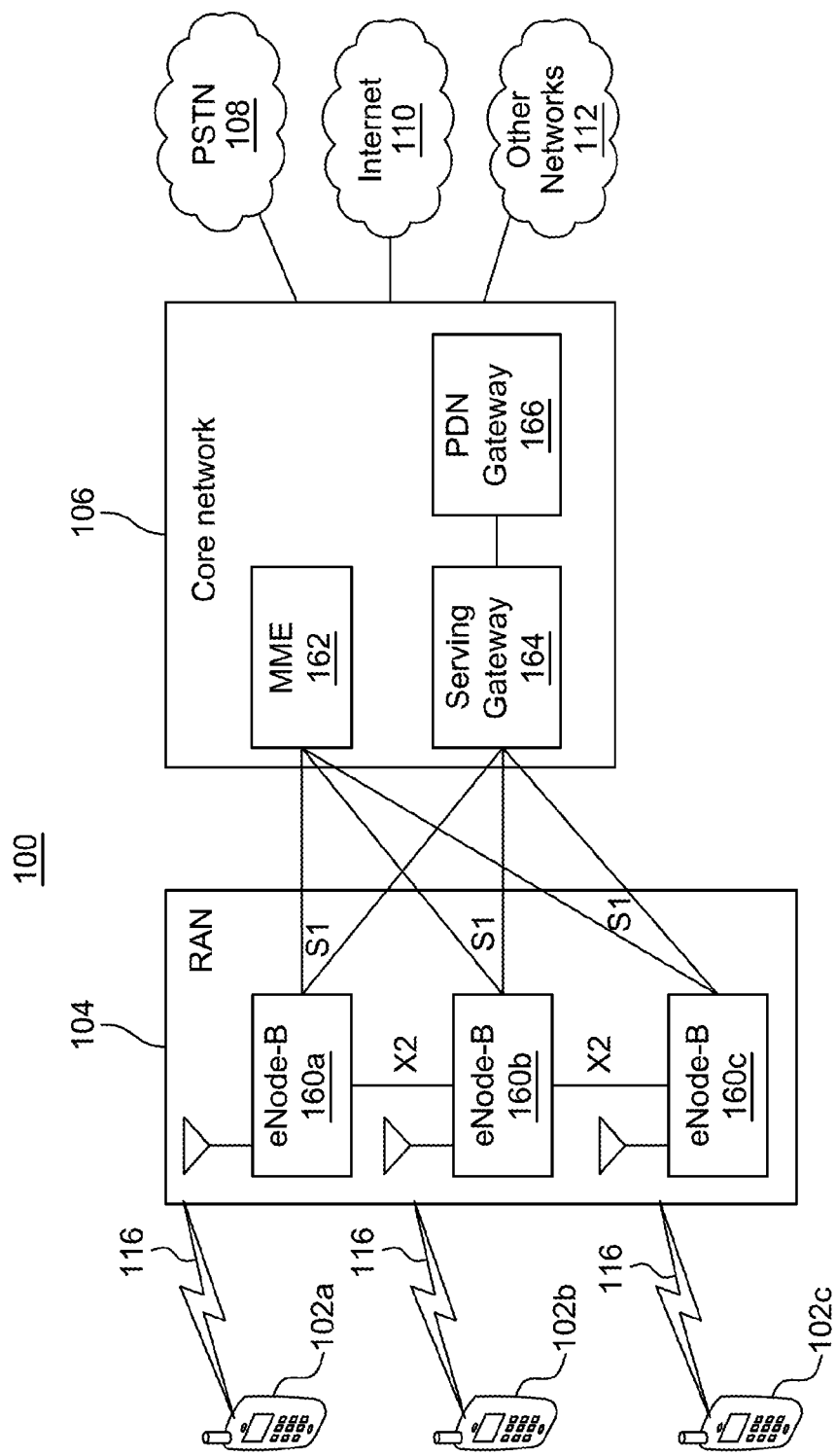
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an AP (or equivalently an AP/PCP, which may be a station (STA) that is at least one of a PCP or an AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other.

The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
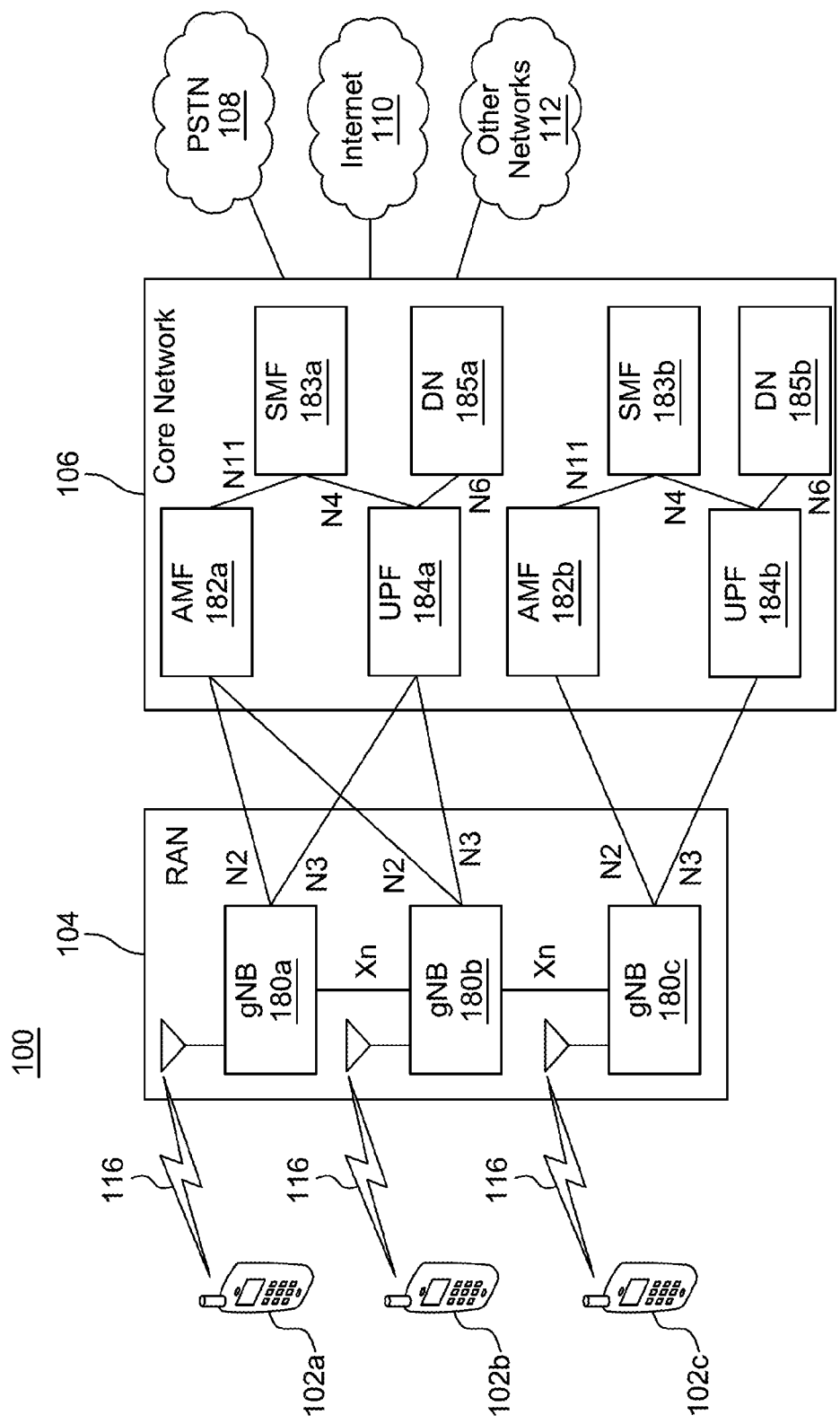
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*/182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-ab*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

To improve spectral efficiency, 802.11ac supports DL Multi-User MIMO (MU-MIMO) transmission to multiple STAs in the same symbol's time frame, for example during a DL OFDM symbol. DL MU-MIMO may also be supported by 802.11ah. Since DL MU-MIMO, as it is used in 802.11ac, may use the same symbol timing for multiple STAs, then interference of the waveform transmissions to multiple STAs may not be an issue. However, in this case, all STAs involved in MU-MIMO transmission with the AP/PCP must use the same channel or band, which limits the operating bandwidth to the smallest channel bandwidth that is supported by the STA's which are included in the MU-MIMO transmission with the AP/PCP.

802.11ad is an amendment to the WLAN standard, which specifies the medium access control (MAC) and physical (PHY) layers for very high throughput (VHT) in the 60 GHz band. Example features supported by 802.11ad include support for data rates up to 7 Gbits/s, and/or support for three different modulation modes including a control PHY layer with single carrier (SC) and spread spectrum, a single carrier PHY layer, and an OFDM PHY layer. 802.11ad may support use of the 60 GHz unlicensed band, which is available globally. At 60 GHz, the wavelength is 5 mm, which makes compact and antenna or antenna arrays possible. Such an antenna may create narrow RF beams at both transmitter and receiver, which effectively increase the coverage range and reduce the interference. The frame structure of 802.11ad facilitates a mechanism for beamforming training (discovery and tracking). The beamforming training protocol may include two components: a sector level sweep (SLS) procedure, and a beam refinement protocol (BRP) procedure. The SLS procedure is used for transmit beamforming training, and the BRP procedure enables receive beamforming training, and iterative refinement of both the transmit and receive beams. MIMO transmissions, including both SU-MIMO and MU-MIMO, may not be supported by 802.11ad.

Figure 2:
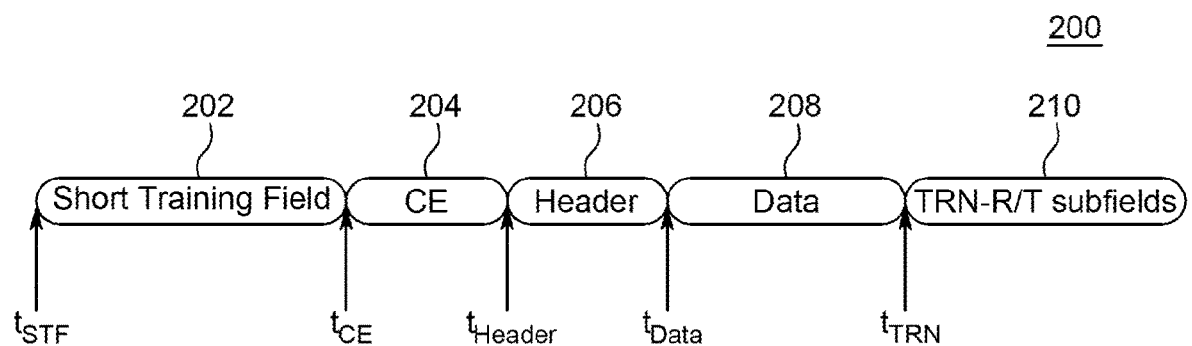
FIG. 2 is an example directional multi-gigabit (DMG) physical layer convergence protocol (PLCP) protocol data unit (PPDU) packet.

802.11ad may support multiple PHY layer protocols, such as single carrier (SC) PHY, OFDM PHY, Control PHY, low power SC PHY. All supported PHY layer protocols may share the same packet structure, though the detailed designs for each field may be different. FIG. 2 is an example directional multi-gigabit (DMG) physical layer convergence protocol (PLCP) protocol data unit (PPDU) packet 200. The DMG PPDU packet may include, but is not limited to include, the following fields: short training field (STF) 202, which may be used for automatic gain control (AGC) and/or (frequency offset) synchronization; channel estimation (CE) field 204, which may be used for channel estimation and/or channel correction; header field 206, which may be used for signaling; data field 208, which may carry the users data payload; and/or training (TRN-R/T) subfields 210, which may be used for beam refinement. Each field may have a corresponding time duration, as shown: $t_{STF}$, $t_{CE}$, $t_{Header}$, $t_{Data}$, and/or $t_{TRN}$.

Figure 3:
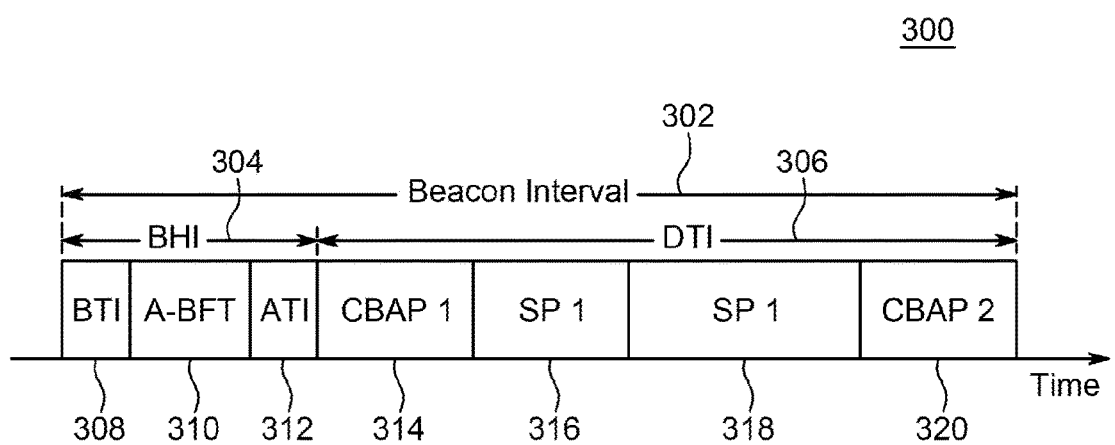
FIG. 3 is an example beacon interval of a DMG channel access scheme in accordance with 802.11ad.

FIG. 3 is an example beacon interval 302 of a DMG channel access scheme 300 in accordance with 802.11ad. Beacon interval 302 may include a beacon header interval (BHI) 304, and/or a data transmission interval (DTI) 306. The BHI 304 may further include a beacon transmission interval (BTI) 308, an association beamforming training (A-BFT) interval 310, and/or an announcement transmission interval (ATI) 312. The DTI 306 may include scheduled service periods (SP) 316 and SP 318, and/or a contention-based access period (CBAP) 320. Other intervals not shown may be included in beacon interval 302.

The BTI 308 may be an access period during which one or more DMG beacon frames are transmitted. Not all DMG beacon frames are detectable by all non-PCP and non-AP STAs. Not all beacon intervals 302 contain a BTI 308. In an example, a non-PCP STA that is also a non-AP STA may not transmit during the BTI 308 of the BSS of which it is a member. The A-BFT 310 may be an access period during which beamforming training is performed with the STA that transmitted a DMG Beacon frame during the preceding BTI 308. The A-BFT 310 may or may not be included in the beacon interval 302 and its presence may be signaled in DMG beacon frames during the previous BTI 308. The ATI 312 may be a request-response based management access period between a PCP/AP and non-PCP/non-AP STAs. The ATI 312 may or may not be included in the beacon interval 302 and its presence may be signaled in DMG beacon frames during the previous BTI 308. The DTI 306 may be an access period during which frame exchanges are performed between STAs. There is may be one DTI 306 per beacon interval 302, or more DTIs may be included in the beacon interval 302.

Task Group ay (TGay) is expected to develop an amendment that defines standardized modifications to both the IEEE 802.11 PHY and MAC layers to enable at least one mode of operation capable of supporting a maximum throughput of at least 20 gigabits per second (Gbps) as measured at the MAC data service access point, while maintaining or improving the power efficiency per STA. This amendment also defines operations for license-exempt bands above 45 GHz while ensuring backward compatibility and coexistence with legacy directional multi-gigabit stations (e.g., as defined by IEEE 802.11ad-2012 amendment) operating in the same band. Although much higher maximum throughput than that of 802.11ad is the primary goal of TGay, it is also proposed to include mobility and outdoor support. More than ten different use cases are proposed and analyzed in terms of throughput, latency, operation environment and applications. Since 802.11ay may operate in the same band as legacy standards, the new technology should ensure backward compatibility and coexistence with legacies in the same band. The highlighted two new technologies include MIMO and channel bonding.

802.11ay is expected to support channel bonding and channel aggregation, which involve combining two or more adjacent channels within a given frequency band to increase throughput. For example, in channel bonding (CB), two sub-channels (e.g. bandwidths 2.16 GHz+2.16 GHz) may be coded as one effective channel. In channel aggregation (CA), two sub-channels may be combined but coded independently as two separate channels.

A number of elements have been included in the specification framework document (SFD) for 802.11ay. For example, the SFD includes full carrier sense and physical and virtual carrier sense shall be maintained on a primary channel. The SFD additionally allows an enhanced directional multi-gigabit (EDMG) STA to transmit a frame to a peer EDMG STA to indicate intent to perform channel bonding transmission to the peer STA. This allows an EDMG STA to choose to operate over multiple channels only after receiving such a frame, thus saving power. The 802.11ay SFD supports that, when using multiple channels, a PCP or an AP may simultaneously transmit to multiple STAs allocated to different channels individually. The 802.11ay SFD supports allocation (scheduling) of SP(s) and scheduled CBAP(s) over more than one channel and/or over a bonded channel. These allocations do not have to include the primary channel. When allocations over different channels overlap in time, the source and destination of such allocations may be different. Channels used for such allocations may be limited to the operating channels of the BSS. Herein, "allocating" and "scheduling" may be used interchangeably with respect to SPs and CBAPs.

Figure 4:
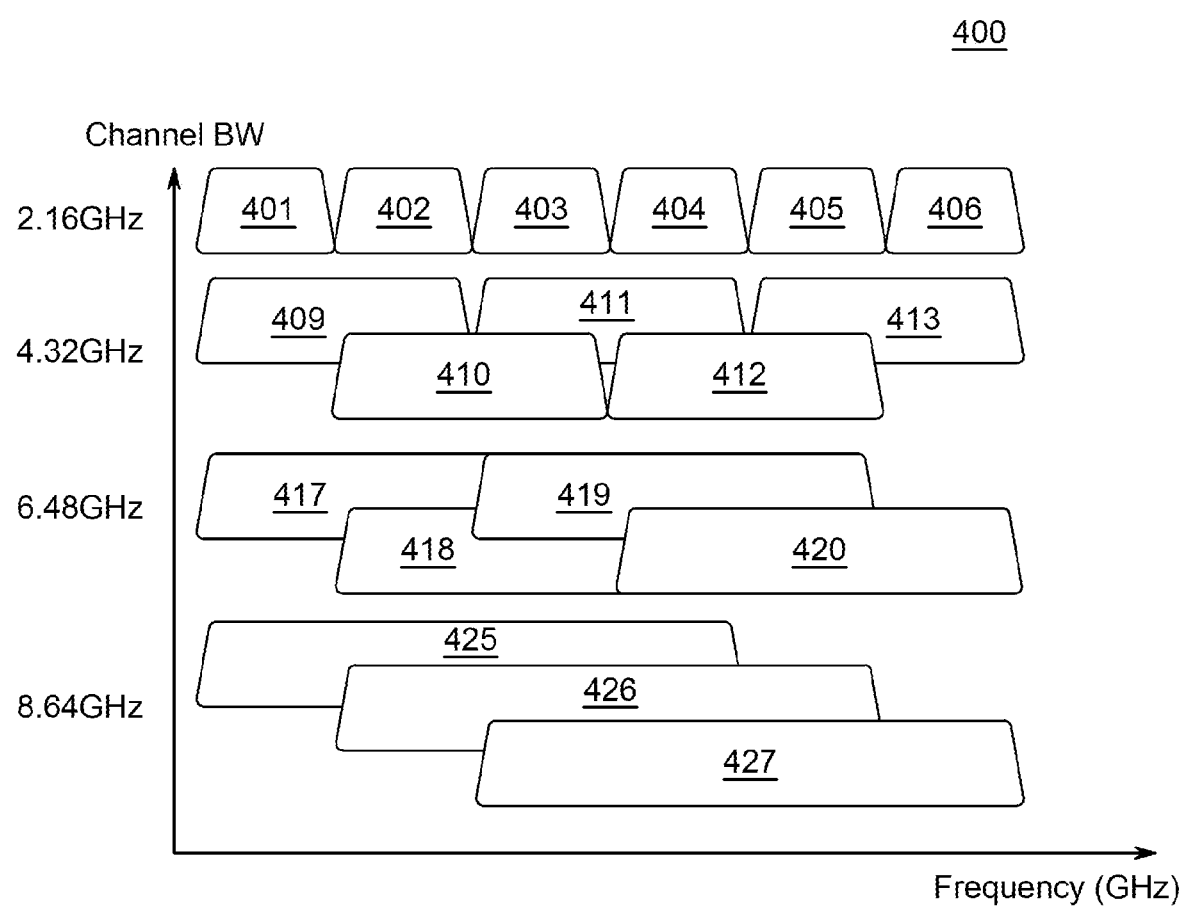
FIG. 4 is an example channelization method.

FIG. 4 is an example channelization method 400, where a mix of channel bonding and channel aggregation is supported. One or more proposals consider 2.16 GHz+2.16 GHz and 4.32 GHz+4.32 GHz modes for channel aggregation. Channels with bandwidths of 2.16 GHz, 4.32 GHz, 6.48 GHz, and 8.64 GHz, may support single channel and/or bonded channel operations. In the example channelization method 400, aggregation is shown as follows: channels 401-406, each with bandwidth 2.16 GHz, may be single, bonded and/or aggregated (e.g., aggregation between channels 401 and 402); channels 409-413, each with bandwidth 4.32 GHz, may be single, bonded and/or aggregated (e.g., aggregation between channels 409 and 410); channels 417-420, each with bandwidth 6.48 GHz, may be single and/or bonded (e.g., bonding between channels 417 and 418); and channels 425-427, each with bandwidth 8.64 GHz, may be single and/or bonded (e.g., bonding between channels 425 and 426).

The EDMG-Header-A, which is the PHY layer header for EDMG devices, may include, but is not limited to include, the following fields: a bandwidth field, a channel bonding field to differentiate between channel bonding and channel aggregation; and/or a primary channel field. These three fields may be included in the control trailer (i.e., field(s) appended to the end of a control mode PPDU to carry control information) for request to send/clear to send (RTS/CTS) setup. A duplicated RTS/CTS approach (e.g., a transmission format of the PHY layer that duplicates a 2.16 GHz non-EDMG transmission in two or more 2.16 GHz channels and allows a STA in a non-EDMG BSS on any one of the 2.16 GHz channels to receive the transmission) has been proposed to carry the bandwidth information for efficient channel bonding operation.

FIG. 5 is an example EDMG preamble 500 format. The EDMG preamble 500 may include, but is not limited to include, the following fields: legacy STF (L-STF) 502 (i.e., non-EDMG STF); legacy channel estimation field (L-CEF) 504 (i.e., non-EDMG CEF); legacy header (L-header) field 506 (i.e., non-EDMG header); EDMG-Header-A field 508; EDMG-STF 510; EDMG-CEF 512; EDMG-Header-B 514; data field 516; automatic gain control (AGC) field 518; and/or training (TRN) field 520. An EDMG preamble 500 format may support multi-channel transmission with MIMO, and/or multi-stream transmission of the non-EDMG part of a preamble using cyclic shifts.

FIG. 6 is an example multi-stream transmission scheme 600 of EDMG preambles over streams 601 and 602. The example multi-stream transmission scheme 600 shows how the L-STF field 606 is constructed on a multi-channel transmission. In this example, channels 603 and 604 may be different, for example, the 2.16 GHz sub-channels of aggregated/bonded channels. Since channels 604 and 604 are separated in the frequency domain, the information at the beginning of the header and up to the EDMG-Header-A 612 may be the same. In some cases, the EDMG-header-A 612 may be different but all other fields may be the same. The example multi-stream transmission scheme 600 allows non-EDMG STAs to read legacy header information (e.g., L-STF 606, L-CEF 608, and/or L-Header field 610) and know that a bonded/aggregated EDMG transmission (EDMG-Header-A 612, EDMG-STF 614, and EDMG-CEF 616) is coming.

The preamble 620, including L-STF 606 and L-CEF 608, may be constructed using Golay Sequences. Each sequence consists of bipolar symbols (+1 or −1). These different preamble types carry basic building blocks as Golay sequences (e.g., $Ga_{128}$ and $Gb_{128}$). Golay sequences have the useful property that their out-of-phase aperiodic autocorrelation coefficients sum to zero, which helps with synchronization.

Figure 7:
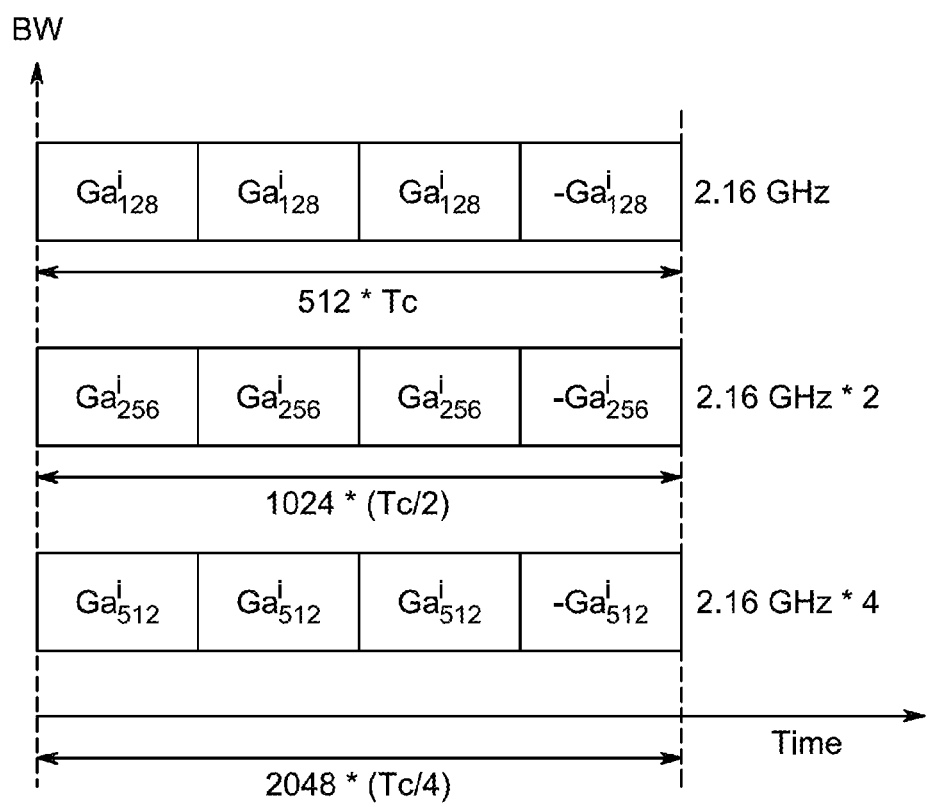
FIG. 7 is an example EDMG-short training field (STF) field with channel bonding.

Other EDMG-STF field and EDMG-CEF field designs may be used by TGay. FIG. 7 is an example EDMG-STF field 700 with channel bonding. In this example, the EDMG-STF field 700 for spatial stream "i" is built of the multiple repetitions of the $Gw^i$ sequence. The $Gw^i$ sequence is composed of Golay sequences, where $Gw^i = [Ga^i_N, Ga^i_N, Ga^i_N, -Ga^i_N]$ and N is the Golay sequence length (e.g., N may be equal to 128, 256, and 512 for the channel bonding (CB)=1, 2, and 4, respectively). A chip duration may be $T_c = 0.57$ nanoseconds (ns). In the example of FIG. 7, the single 2.16 GHz does not use channel bonding, and includes 4×128=512 samples each with size Tc/2. The 2×2.16 GHz channel bonded channel has a channel bonding size of two with separate but adjacent channels, and includes 4×256=1024 samples each with size Tc/2. The 4×2.16 GHz channel bonded channel has a channel bonding size of four with separate but adjacent channels, and includes 4×512=2048 samples each with size Tc/4.

An EDMG-Header_B field may or may not be used for MIMO transmission. A modulation and coding scheme (MCS) for EDMG-Header-B has been proposed by TGay in the case of SC PHY MU-MIMO. In an example, an EDMG-Header-B field may be transmitted using two SC symbol blocks. For each SC symbol block, part of the coded and modulated EDMG-Header-B symbols, referred to as $blk^i$ for $i^{th}$ stream, may be carried by 448 chips, and a guard interval (GI) with a Golay $Ga^i_{64}$ sequence of length 64 chips may be appended. Thus a SC symbol block without channel bonding may be defined by the vector $[Ga^i_{64}, blk^i]$. For channel bonding with 2, 3 and 4 channels, the SC symbol block may be defined by matrices as shown in Equation 1:

$$NCB=2: [Ga^i_{128}, blk^i, blk^i]$$

$$NCB=3: [Ga^i_{192}, blk^i, blk^i, blk^i]$$

$$NCB=4: [Ga^i_{256}, blk^i, blk^i, blk^i, blk^i] \quad \text{Eq. 1}$$

802.11ad and/or 802.11ay may consider an SC waveform that allows frequency domain equalization at the receiver. However, if there are multiple users that access the adjacent bands in the UL or if an AP serves multiple users with multiple SC waveforms operating on the adjacent bands, inter-carrier interference (ICI) may occur after the FFT operation is applied at the receiver because the various SC waveform signals may not be orthogonal to each other. For example, degradation may occur in the UL when the received signal power of the various SC waveform signals differs significantly from each other after beamforming. Thus, the embodiments disclosed herein may ensure the orthogonality in time and frequency between SC waveforms from multiple users.

Channel bonding and/or channel aggregation may not be used in 802.11ad. Thus, 802.11ad may not provide a mechanism to schedule (allocate) an SP and/or a CBAP for multi-channel transmission. Moreover, with a channel bonding/aggregation transmission, more than one channel may be used for a single transmission, such that the transmission may be more vulnerable to interference from an overlapping BSS.

When a transmitting device (e.g., an AP/PCP or a non-AP/non-PCP STA) starts transmission over multiple channels, the receiving device(s) may need to know the analog/baseband beamforming scheme used, and thus corresponding receiving beams may be prepared for the transmission. The embodiments herein include design and transmission schemes for a multi-channel setup frame and multi-channel enabled transmission period that may be used to ensure that the receiving device(s) know the analog/baseband beamforming scheme used.

Figure 8:
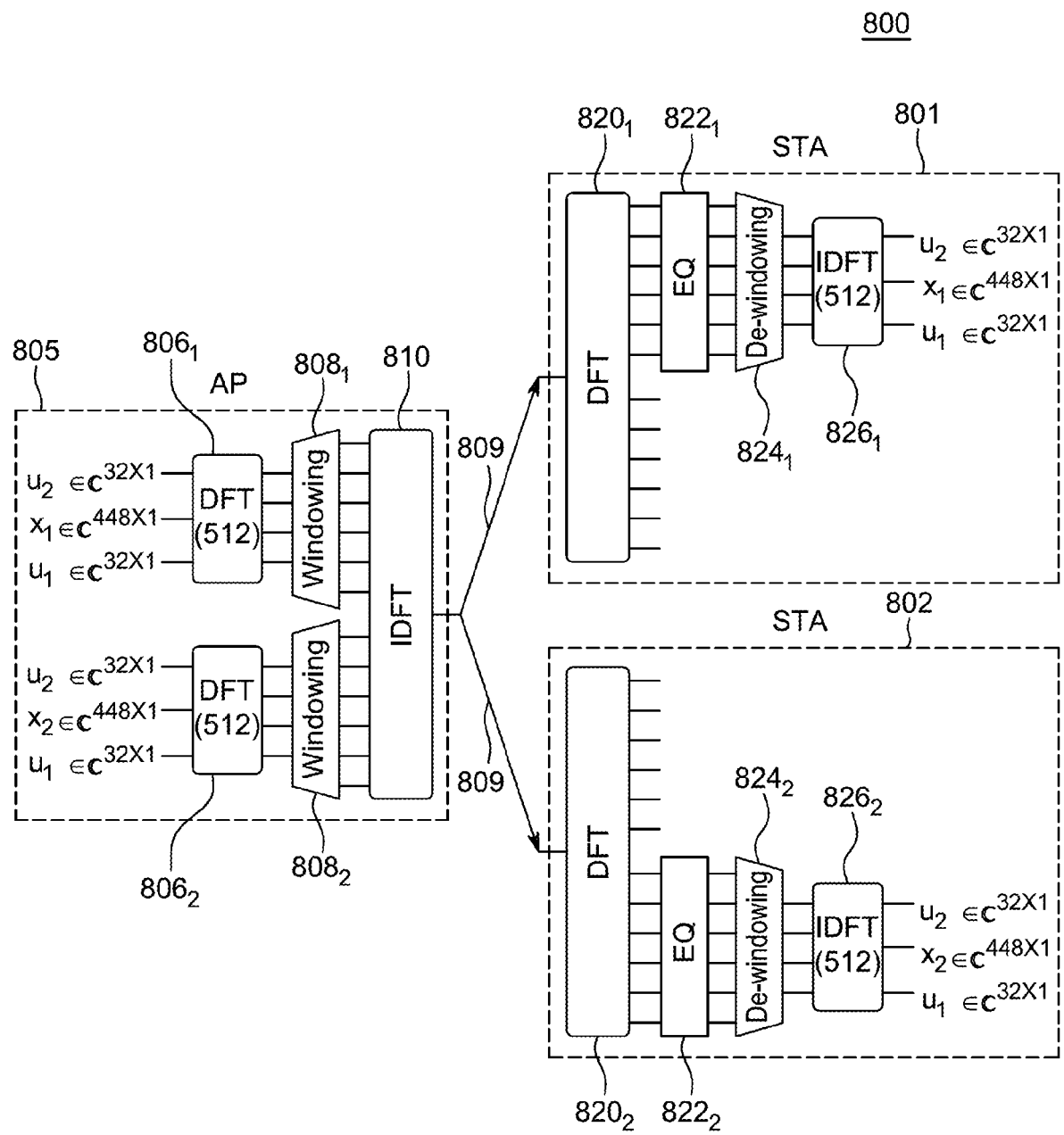
FIG. 8 is a system diagram of an example BSS where an AP synthesizes two single carrier (SC) waveforms for transmission to two STAs.

According to an example embodiment, in accordance with the disclosures herein, SC waveforms generated simultaneously from (or for) different STAs in the UL (or DL) may have a non-overlapping structure in the frequency domain by using a discrete Fourier transform (DFT)-spread OFDM structure. For example, FIG. 8 is a system diagram of an example BSS 800 showing how an AP 805 may synthesize two SC waveforms in to a single waveform (signal) 809 for simultaneous transmission to STAs 801 and 802. Each STA 801 and 802 may extract its own SC waveform from the received signal 809. The AP 805 (similarly, a PCP) may include, but is not limited to include, the following components: DFT-spread blocks 806₁ and 806₂; windowing functions 808₁ and 808₂; and an inverse discrete Fourier transform (IDFT) operation block 810. The STA 801 may include, but is not limited to include, the following components: DFT-spread block 820₁; equalizer block 822₁; de-windowing function 824₁; and IDFT operation block 826₁. Similarly, STA 802 may include, but is not limited to include, the following components: DFT-spread block 820₂; equalizer block 822₂; de-windowing function 824₂; and IDFT operation block 826₂. Other components and functionality not shown may be included in the AP 805 and the STAs 801 and 802.

The inputs $u_2 \in C^{32 \times 1}, x_2 \in C^{448 \times 1}$ are complex numbers with respective lengths 32 bits and 448 bits (similar definitions apply to inputs $u_1$ and $x_1$), and are transformed by the DFT-spread blocks 806₁ and 806₂, and weighted by windowing coefficients (the widowing coefficients may not overlap) in windowing functions 808₁ and 808₂, and provided as subcarrier indices to the IDFT block 810, as shown in FIG. 8.

The AP 805 may use DFT-spreading, via DFT-spread blocks 806₁ and 806₂, and a frequency domain windowing operation, using windowing functions 808₁ and 808₂, before an IDFT operation block 810 to synthesize two SC waveforms, intended for STA 801 and STA 802 respectively, into signal 809 transmitted through the antenna (or antennae). In this example, frequency domain windowing 808₁ and 808₂ may be similar to time-domain windowing, in which the first and last sample of the output of the corresponding DFT-spread block 806₁ and 806₂ is smoothed via the corresponding windowing function 808₁ and 808₂ after cyclic prefix and cyclic suffix extensions. The orthogonality between the two SC waveforms within signal 809 may be ensured by not overlapping the output of the frequency domain windowing operations 808₁ and 808₂ in frequency (e.g., using filter passband and a filter stopband that do not overlap). Each STA 801 and 802 may respectively process the received signal 809 . . . . At the receiving end, STA 801 (and similarly STA 802) applies DFT 820₁ to received signal 809, equalization 822₁ (e.g., single tap frequency domain equalization), de-windowing 824₁ (e.g., a weighting operation and a combination operation), and IDFT 826₁ to recover the signals $u_1, u_2$ and $x_1$.

Figure 9:
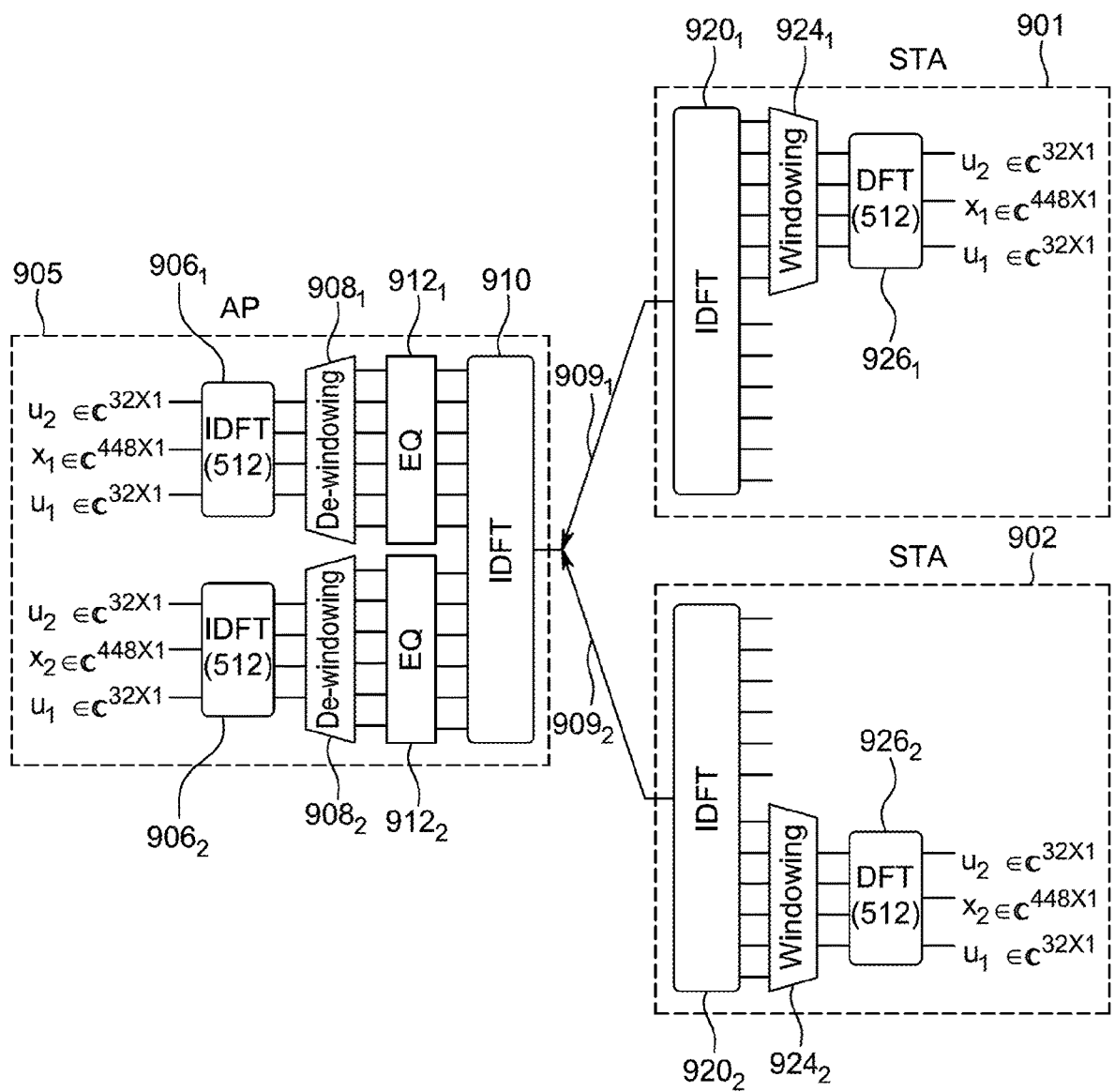
FIG. 9 is a system diagram of an example BSS showing non-overlapping structure in the uplink (UL) for two STAs transmitting their SC waveforms on adjacent channels.

FIG. 9 is a system diagram of an example BSS 900 showing the non-overlapping structure in the UL where the STAs 901 and 902 transmit their SC waveforms 909₁ and 909₂ on adjacent channels. The AP 905 (similarly, a PCP) may include, but is not limited to include, the following components: IDFT operation blocks 906₁ and 906₂; de-windowing functions 908₁ and 908₂; equalizers 912₁ and 912₂; and DFT-spread block 910. The STA 901 may include, but is not limited to include, the following components: IDFT operation block 920₁; windowing function 924₁; and DFT-spread block 926₁. The STA 902 may include, but is not limited to include, the following components: IDFT operation block 920₂; windowing function 924₂; and DFT-spread block 926₂. Other components and functionality not shown may be included in the AP 905 and the STAs 901 and 902. Since the inputs of the IDFT blocks 920₁ and 920₂ are not the same, the orthogonality between the signals 909₁ and 909₂ transmitted by the STAs 901 and 902 (i.e., the users) is maintained at the receiver side, which in this case is the AP 905.

According to an example embodiment, in accordance with the disclosures herein, a windowing operation (e.g., windowing operations 924₁ and 924₂ in FIG. 9) may be generalized to achieve cyclic shifts in the time domain in order to achieve a cyclic delay diversity in MIMO operations. The same property may be used for achieving block-based linear shifts for SC waveforms. According to another example embodiment, the number of frequency bins (i.e., subcarriers, such that each input of a DFT corresponds to a frequency bin) between the DFT-spread blocks (e.g., DFT-spread blocks 926₁ and 926₂ in FIG. 9) and the separation between the output of the frequency domain windowing operation (e.g., windowing operations 924₁ and 924₂ in FIG. 9) on the transmitting side (AP or STA) may be larger than zero to allow different windowing types.

Figure 10:
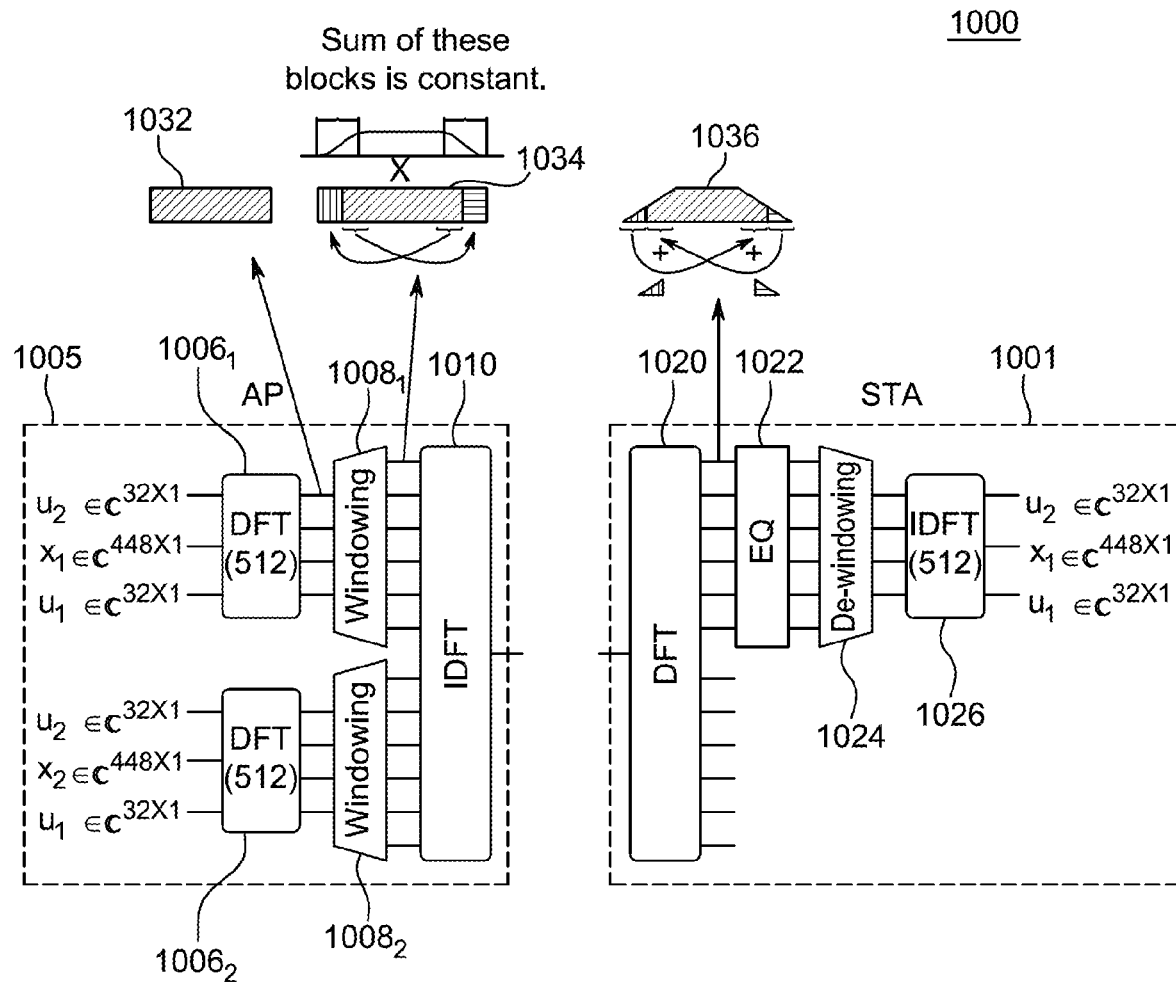
FIG. 10 is a system diagram of an example BSS illustrating some details of the windowing and de-windowing operations.

More than one design is possible for the windowing function. For example, the windowing function may be designed to have a specific structure in which the windowing achieves vestigial symmetry. This operation may allow for a low-complex receiver structure utilizing a de-windowing operation, as illustrated in the example of FIG. 10. FIG. 10 is a system diagram of an example BSS 1000 illustrating some details of the windowing and de-windowing operations. The AP 1005 (similarly, a PCP) may include, but is not limited to include, the following components: DFT-spread blocks 1006₁ and 1006₂; windowing functions 1008₁ and 1008₂; and IDFT operation block 1010. The STA 1001 may include, but is not limited to include, the following components: DFT-spread block 1020; equalizer 1022; de-windowing function 1024; and IDFT operation block 1026. In the example shown in FIG. 10, the size of the data symbols, for example $x_1, x_2$ may or may not be fixed, and the sequences $u_1, u_2$ may or may not be fixed and may be adjusted depending beamforming abilities at the transmitter. In addition, the same structure may be considered to synthesize STF and CEF fields by using constant symbols instead of data symbols.

The frames 1032, 1034 and 1036 illustrate examples of how windowing works in the BSS 1000. At the transmitter 1005, output frame 1032 of DFT block 1006₁ becomes the middle of frame 1034 after windowing function 1008₁, with added extensions on either side, where the arrows show how the extension are applied. As part of the windowing function 1008₁, the extended frame 1032 is multiplied windowing function 1008₁, and the resulting frame is mapped to the subcarrier(s) for IDFT transformation 1010. At the receiver 1001, after DFT 1020 and equalization 1022, de-windowing 1024 is applied, as illustrated in frame 1036. As shown by arrows, de-windowing operation 1024 overlaps the sidebands to the main lobe of frame 1036. After the de-windowing operation 1024, IDFT 1026 is calculated. In another example, different windowing function than what is shown in FIG. 10 may be used.

Figure 11:
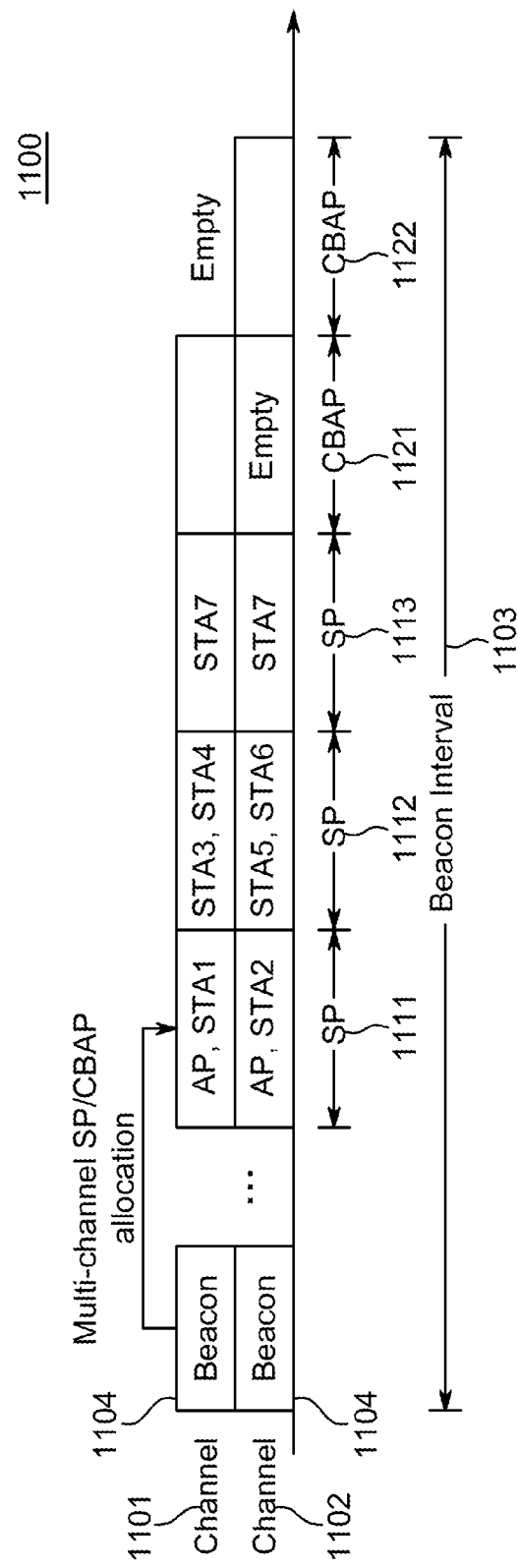
FIG. 11 is a messaging diagram of an example multi-channel access and transmission procedure with channel bonding/channel aggregation (CB/CA) over two channels within a beacon interval.

According to an example embodiment, in accordance with the disclosures herein, an AP/PCP may allocate an SP and/or a CBAP in the beacon interval. An SP and CBAP scheduling and allocation procedure may be defined for communications using channel bonding/aggregation. FIG. 11 is a messaging diagram of an example multi-channel access and transmission procedure 1100 with channel bonding/channel aggregation (CB/CA) over two channels, 1101 and 1102, within a beacon interval 1103. In this example, an AP/PCP may transmit a beacon frame 1104 (e.g., sent on the primary channel 1101 only or in duplicated mode with a separate beacon frame 1104 on each channel 1101 and 1102), which may include at least a multi-channel SP/CBAP allocation. In an example not shown in FIG. 11, the scheduling signals may be included in an announcement frame or other type of management/control frame(s) (not shown).

The AP/PCP may schedule a SP/CBAP over multiple channels where the AP/PCP may communicate with multiple STAs using the scheduled SP/CBAP. For example, with reference to FIG. 11, the AP may communicate with STA1 and STA2 during SP 1111. The AP/PCP may schedule a SP/CBAP over multiple channels where each respective channel may be allocated to a pair of transmit and receive (Tx/Rx) STAs. For example, the AP may communicate with STA3 and STA4 over channel 1101, and with STA5 and STA6 over channel 1102 during SP 1112, respectively. The AP/PCP may schedule a SP/CBAP over multiple channels where the AP/PCP may communicate with one STA using this SP/CBAP. For example, with reference to FIG. 11, the AP may communicate with STA7 over channels 1101 and 1102 during SP 1113. The AP/PCP may schedule a SP/CBAP over one or more channel(s) (e.g., a subset of the channels) where the AP/PCP may communicate with one or more STAs, or allow for contention-based access, as shown in CBAP 1121 and CBAP 1122. Channel 1102 in CBAP 1121, labeled "empty", may not be used for contention in the BSS (e.g., due to OBSS activity).

Example principles for multi-channel scheduling in a beacon interval include the following, in accordance with the disclosures herein. In an example, the AP/PCP may allocate SP/CBAPs over more than one channel using either channel bonding/aggregation. In another example, the AP/PCP may allocate SP for multi-channel multi-user transmission; for example, the AP may use the SP to communicate with multiple STAs where each STA may be allocated to one channel (e.g., an exclusive channel per STA). In another example, the AP/PCP may allocate SP for multi-channel multi-user transmission. For example, the AP may use the SP to communicate with multiple STAs where each STA may be allocated to a channel, which may be shared (e.g., using MU-MIMO transmission) for simultaneous transmission and/or reception (UL and/or DL) with two or more STAs.

In order to mitigate inter-BSS interference during a SP and/or a CBAP, the AP/PCP may coordinate with a neighboring overlapping BSS (OBSS) (i.e., a BSS with a coverage area that overlaps with the coverage area of the BSS), and allocate the SPs to its STAs accordingly. In this way, the AP/PCP may monitor the beacon frames and/or the announcement frames from OBSS AP/PCPs.

In another example, all the STAs (in the BSS) may monitor all of the beacon frames, including the beacon frames transmitted from an OBSS AP/PCP. A non-AP STA that overheard (received) beacon frame(s) from an OBSS AP/PCP may, in some cases, report the received information to its associated AP/PCP (in the same BSS). In an example scenario, if the associated AP/PCP may send a message requesting non-AP STAs in its BSS to report OBSS scheduling information. In another example, the associated AP/PCP may include a list of OBSS AP/PCPs from which the associated AP/PCP may monitor/receive/hear the beacon frames. In this case, the non-AP STAs may report information from AP/PCPs which are not on the list. In another example, the AP/PCP may indicate its capability of monitoring OBSS beacon transmissions in its own beacon frame, or any other type of management frame. In this case, the associated non-AP STAs may indicate its capability of monitoring OBSS beacon transmissions in its capability field of an association frame or any other type of management frame. The STAs, including both AP/PCP STAs and non-AP STAs, may monitor the beacon frames which may be transmitted from AP/PCP which may have a capability field set.

In an example, the allocation (scheduling) of SPs in a BSS may avoid the allocated SPs in another BSS (e.g., an OBSS). For example, the AP/PCP may notice another AP/PCP (e.g., in an OBSS) assigns an SP starting from time $t_0$ with duration T. In an example, the AP/PCP may treat a scheduled OBSS SP differently from a scheduled OBSS CBAP. For example, the AP/PCP may not allocate anything if an OBSS SP is present. If an OBSS CBAP is present, the AP/PCP may try to allocate other non-overlapping/non-occupied time/frequency slot(s) first. If no non-overlapping/non-occupied time/frequency slot are available, the AP/PCP may allocate the CBAP occupied time/frequency slot. In an example, the AP/PCP may allocate a CBAP during the occupied OBSS CBAP.

Based on the property of this SP or CBAP assignment (allocation), the AP/PCP may assign multi-channel transmissions using any of one or more of the following methods. For a channel (e.g., a first channel) that may not be interfered by the OBSS transmission, the AP/PCP may allocate that channel to its associated STAs. The allocation may be for a SP and/or a CBAP. For a channel (e.g., a second channel) that is overlapping with the OBSS and has been allocated, the AP/PCP may not allocate corresponding time blocks (e.g., leave the corresponding time blocks empty) so that the corresponding time blocks may be used by the OBSS STAs. For a channel (e.g., a third channel) that is overlapping with the OBSS and has been allocated, the AP/PCP may allocate corresponding time blocks on the channel that may also be used by the OBSS STAs. In this case, the AP/PCP may include a field to indicate the time blocks may be used by the OBSS STAs in the allocation signaling (e.g., in an extended schedule element, a dynamic allocation information field, a modified extended schedule element, and/or a modified dynamic allocation information field control trailer field). Additionally, the AP/PCP may include more fields in the SP/CBAP allocation to indicate the usage of the OBSS STA, including, but not limited to, the following example fields: SP allocation; CBAP allocation; a truncate indicator field to indicate whether the allocation is able to be truncated; an extendable indicator field to indicate whether the allocation is extendable; and/or an indicator field to indicate whether the allocation is dynamic. Thus the STAs may be protected by specific protection mechanisms while perform transmission on the allocated time block on the channel. Examples of protection mechanisms, include, but are not limited to, the following mechanism: carrier-sensing (e.g., carrier-sensing multiple access (CSMA)); virtual carrier-sensing; and/or an RTS/CTS procedure.

According to an example embodiment, in accordance with the disclosures herein, a group allocation mechanism may be used to mitigate the OBSS interference. For example, the AP/PCP may group SPs/CBAPs with certain properties into pre-defined periods, which may be referred to as allocation group periods (AGPs). For example, the AP/PCP may group SPs/CBAPs with similar channel bonding/aggregation properties into one or more AGPs, such that each AGP may include one or more SPs and/or CBAPs. For example, the AP/PCP may group SPs/CBAPs using CB/CA in one or more AGPs, group SPs/CBAPs without CB/CA in one or more other (different) AGPs. A beacon interval may include one or more AGPs.

Figure 12:
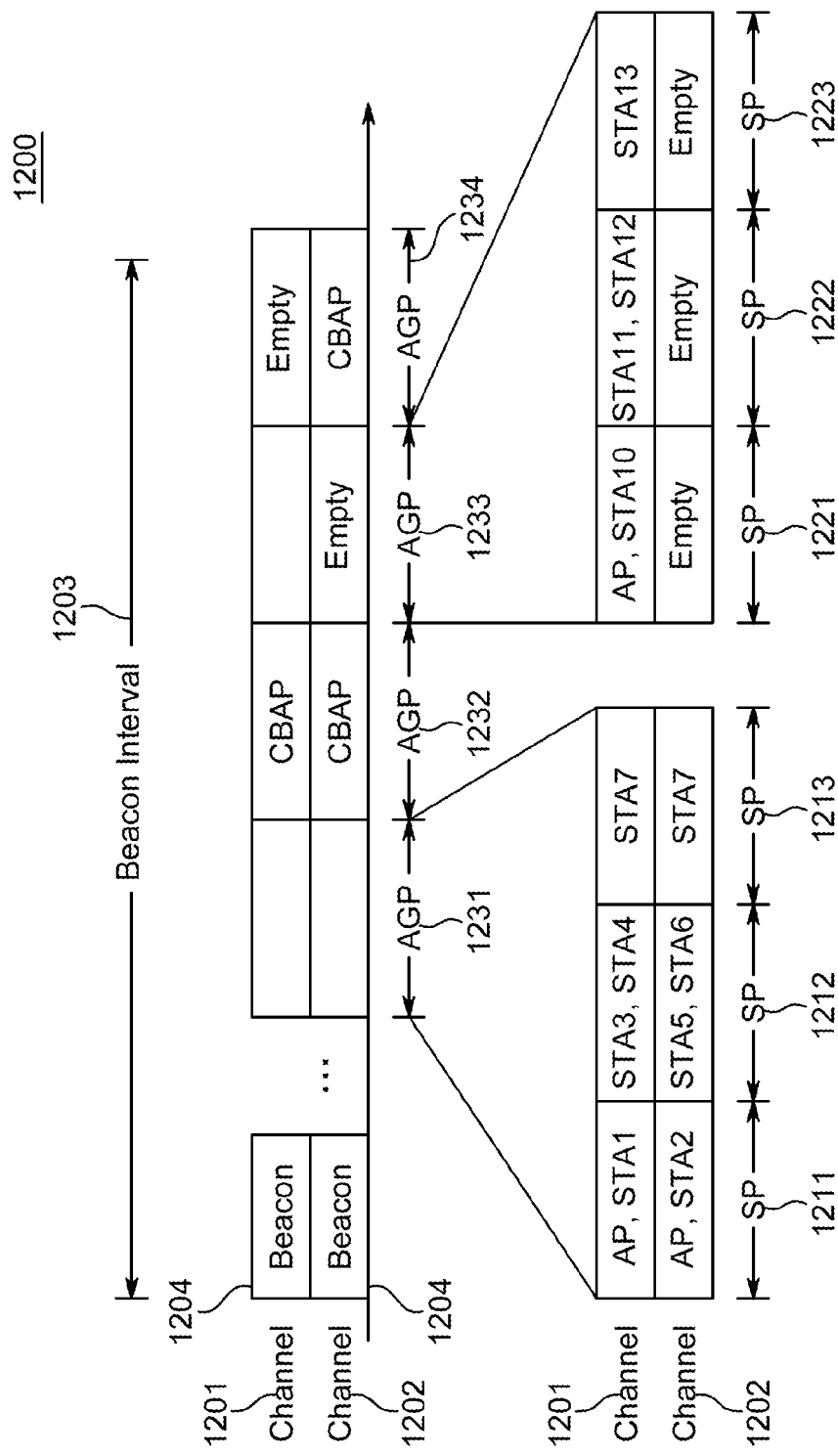
FIG. 12 is a messaging diagram of an example multi-channel access and transmissions procedure using multiple allocation group periods (AGPs) during a beacon interval.

FIG. 12 is a messaging diagram of an example multi-channel access and transmissions procedure 1200 using multiple AGPs 1231, 1232, 1233, and 1234 during beacon interval 1203. CB/CA may or may not be used over channels 1201 and 1202 in different AGPs. For example, in AGP 1231, the AP/PCP may allocate/schedule SPs 1211, 1212 and 1213 for CB/CA transmission. In this example, the AP/PCP may communicate with STA1 and STA2 in SP 1211, and with STA3, STA4, STA5, and STA6 in SP 1212, and with STA7 in SP 1213. In AGP 1232, the AP/PCP may allocate/schedule CBAPs for CB/CA transmission using channels 1201 and 1202. In AGP 1233, the AP/PCP may allocate/schedule SPs/CBAPs to transmit over channel 1201 (e.g., channel 1201 may be the primary channel) while not allocating transmission over channel 1202 and thus not using CB/CA. In this example, during AGP 1233, the AP/PCP may communicate on channel 1201 with STA10 in SP 1221, and STA11 and STA12 in SP 1222, and STA13 in SP 1223. In AGP 1234, the AP/PCP may allocate/schedule SPs/CBAPs to transmit over channel 1202 (e.g., channel 1201 may be a secondary channel) while not using channel 1201 and thus not using CB/CA. In this example, in AGP 1234 channel 1202 may be used for CBAP. In this way, AGP 1233 and AGP 1234 may be shared with neighboring OBSS transmissions. For example, the OBSS AP/PCP may allocate/schedule AGPs using the empty channel (e.g., channel 1202 in AGP 1233 and channel 1201 in AGP 1234).

According to an example embodiment, in accordance with the disclosures herein, an AP/PCP may use hierarchical signaling to indicate the AGP and/or SP/CBAP scheduling. The hierarchical scheduling information may be carried in a control frame, such as a beacon frame, an announcement frame or any other type of control or management frames. The hierarchical signaling may be used to enable multi-channel multi-user transmission over the SP/CBAPs. The hierarchical signaling may be used to enable MIMO transmission over the SP/CBAPs.

SPs/CBAPs in each AGP may share one or more common properties such as CB/CA properties, and thus a common signaling field may be used to indicate the common properties for the periods scheduled in an AGP. Thus, the common information may not need to be repeated, which reduces the signaling overhead. In an example, a common information field may indicate the number of individual allocations in the AGP. An individual SP/CBAP allocation field may be signaled for each SP/CBAP in an AGP and may carry specific information for the respective SP/CBAP.

Figure 13:
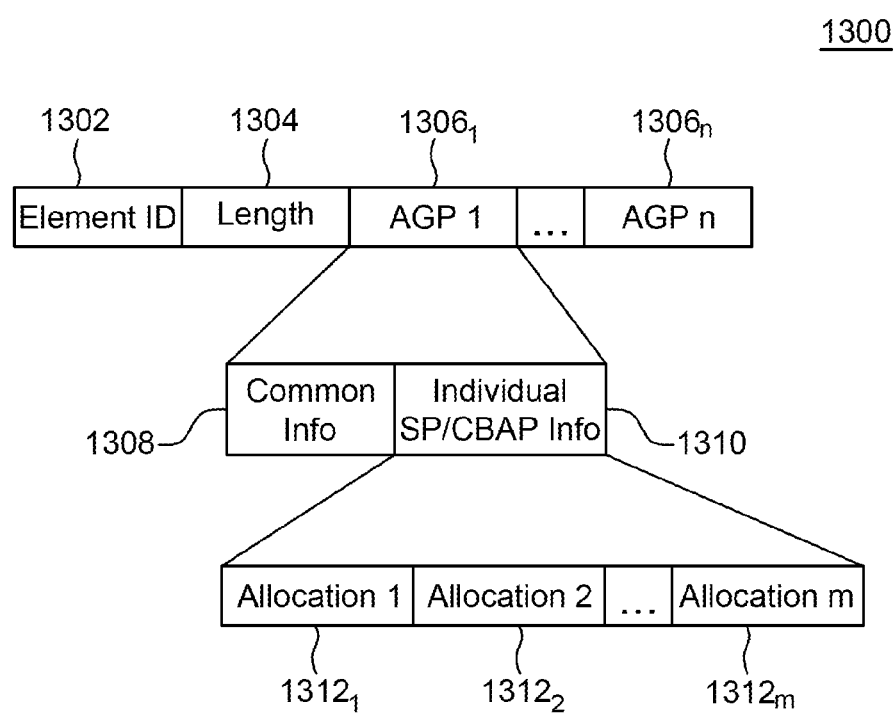
FIG. 13 is an example hierarchical signaling element for group allocation using AGP for multi-channel access and transmission.

FIG. 13 is an example hierarchical signaling element (or frame) 1300 for group allocation using AGP for multi-channel access and transmission. The hierarchical signaling element 1300 may be carried, for example, in a beacon frame, an announcement frame or other type of control/management frame. The hierarchical signaling element 1300 may include, but is not limited to include, any of the following fields: an element identification (ID) field 1302, which may be used to indicate the hierarchical allocation/schedule signaling; a length field 1304, which may be used to indicate the length of the hierarchical signaling element 1300; and/or AGP fields $1306_1 \ldots 1306n$ for the n AGP groups, which may carry information about the respective AGP groups. The example shown in FIG. 13 (and FIG. 14) shows signaling using an information element (IE)-type format, however the disclosed fields and solutions may be used in formats other than IEs, such as extension fields. For example, if extension field format is used, then the element ID field 1302 and/or the length field 1304 may not be used.

Each AGP field $1306_1 \ldots 1306n$ may include subfields, as illustrated for AGP $1306_1$. For example, AGP field $1306_1$ may include a common information field 1308, which may carry common information shared by the SPs/CBAPs in the corresponding AGP. Multiple examples of common information that may be included in the common information field 1308 are given in following. For example, the common information field 1308 may include channel information (e.g., one or more channel information fields). Examples of such channel information may include, but is not limited, any one or more of the following fields (not shown): a CB/CA field, which may be used to indicate whether channel bonding, and/or channel aggregation is allowed; a multi-channel multi-user field, which may be used to indicate whether multi-user transmission is supported; a maximum operation bandwidth field, which may be used to indicate the maximum allowed operation channel bandwidth; and/or a channel allocation information field, which may be used to indicate which channel or channels may be allocated to the AGP (e.g., a channel index or a channel index bitmap may be used to indicate the channel allocation).

The common information field 1308 may carry an SP/CBAP field, which may indicate whether the AGP include SPs, or CBAPs or a mix of SPs and CBAPs; a number of allocations in the AGP; an allocation properties field which may be used to indicate whether the allocations in the AGP are pseudo static, able to be truncated, extendable, PCP/AP active. The common information field 1308 may carry an interference field, which may indicate whether interference is in the AGP (examples of interference include OBSS interference and/or interference from spatial sharing transmission within the same BSS). In an example, the AP/PCP may set the interference field if the AP/PCP detects the OBSS beacon or announcement frames (which may carry SP/CBAP assignment) transmitted by the OBSS AP/PCP on the channels by the OBSS. In the case that CB/CA is used, the interference field may be used to indicate the interference condition on each channel.

The common information field 1308 may carry a spatial sharing field, which may indicate whether spatial sharing operation is allowed or not. Spatial sharing may be performed over the channel(s) indicated in channel information field. The spatial sharing field may indicate whether spatial sharing is allowed on each channel. Spatial sharing may refer to transmissions between two pairs of transmitters and receivers within one BSS or in different BSS (e.g., STA1 and STA2 may communicate using an SP or CBAP, while STA3 and STA4 may communicate using the same time slot, where STA1, STA2, STA3, and STA4 belong to one or more BSSs).

The common information field 1308 may carry a MIMO field, which indicate whether MIMO transmission are allowed or not. The MIMO field may include subfields to indicate whether SU-MIMO and/or MU-MIMO are allowed. The MIMO transmission may be performed over the channel(s) indicated in channel information field, and/or the MIMO field may indicate whether MIMO (or SU-MIMO and MU-MIMO) is allowed on each channel.

The common information field 1308 may carry a beamforming training field, which may indicate whether beamforming training is allowed or not. The beamforming training field may indicate the SPs/CBAPs in the AGP that are dedicated for or include beamforming training and feedback frames. The beamforming training may be performed over the channel(s) indicated in channel information field, or the beamforming training field may indicate whether beamforming training is allowed on each channel. The beamforming training SPs/CBAPs may sweep using multiple beams, and thus may introduce more interference to neighboring transmissions. In the case that beamforming training field is set, the OBSS AP/PCP and STAs may expect interference and/or beam sweep on the assigned channel(s).

The common information field 1308 may carry a multi-user field, which may indicate whether multi-user transmission is allowed or not.

Figure 14:
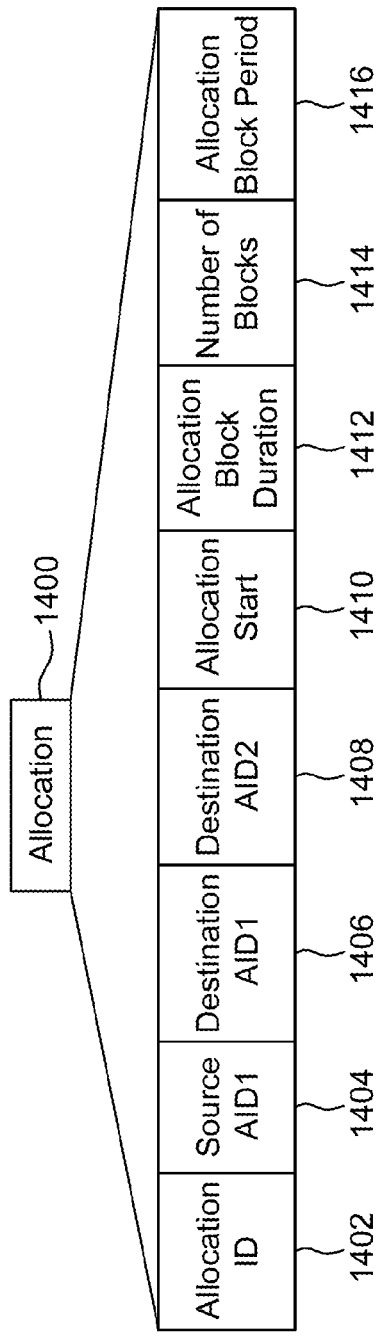
FIG. 14 is an example allocation information field that may be included in a hierarchical signaling element for group allocation using AGP for multi-channel access and transmission.

Another subfield of AGP field 1306₁ may be an individual SP/CBAP field 1310, which may carry allocation information fields 1312₁ . . . 1312ₘ for each individual SP/CBAP allocation (there are m SP/CBAP allocations in this example). For example, the individual SP/CBAP field 1310 may carry, for each allocation in its respective allocation fields 1312₁ . . . 1312ₘ, any one or more of the following information: allocation start information; allocation block duration; a number of blocks for the allocation; an allocation block period; and/or an allocation duration. A detailed example of an allocation information fields 1312₁ . . . 1312n, is shown in FIG. 14. Moreover, some fields that may be included in the common information field 1308 may be carried by the individual SP/CBAP information fields 1310, for example in the case that the corresponding AGP may allow different settings on the corresponding field.

FIG. 14 is an example allocation information field 1400 that may be included in a hierarchical signaling element for group allocation using AGP for multi-channel access and transmission. The example allocation information field 1400 may include, but is not limited to include, any of the following fields: an allocation ID field 1402 identifying the SP/CBAP allocation; one or more source association identifier (AID) fields 1404 (may depend on the properties indicated in the common field); on or more destination AID fields 1406, (may depend on the properties indicated in the common field); an allocation start time field 1410; an allocation block duration field 1412; an number of blocks field 1414; and/or an allocation block period field 1416. In an example, one source AID and one destination AID may be included in each allocation information field 1400. In the case of MU-MIMO transmission and multi-channel multi-user transmission, more than one allocation may be defined for the same time slot.

According to an example embodiment, in accordance with the disclosures herein, a backward compatible allocation signaling scheme may be used for multi-channel access and transmission. An extended schedule information element (IE) may be used to carry SP/CBAP scheduling information, and may be extended to signal additional information. In order to maintain backward compatibility (e.g., with 802.11ad), the reserved bits and/or bits not fully used in an extended schedule IE may be used to carry additional information. In this way, only limited information may be carried using the extended schedule IE.

Figure 15:
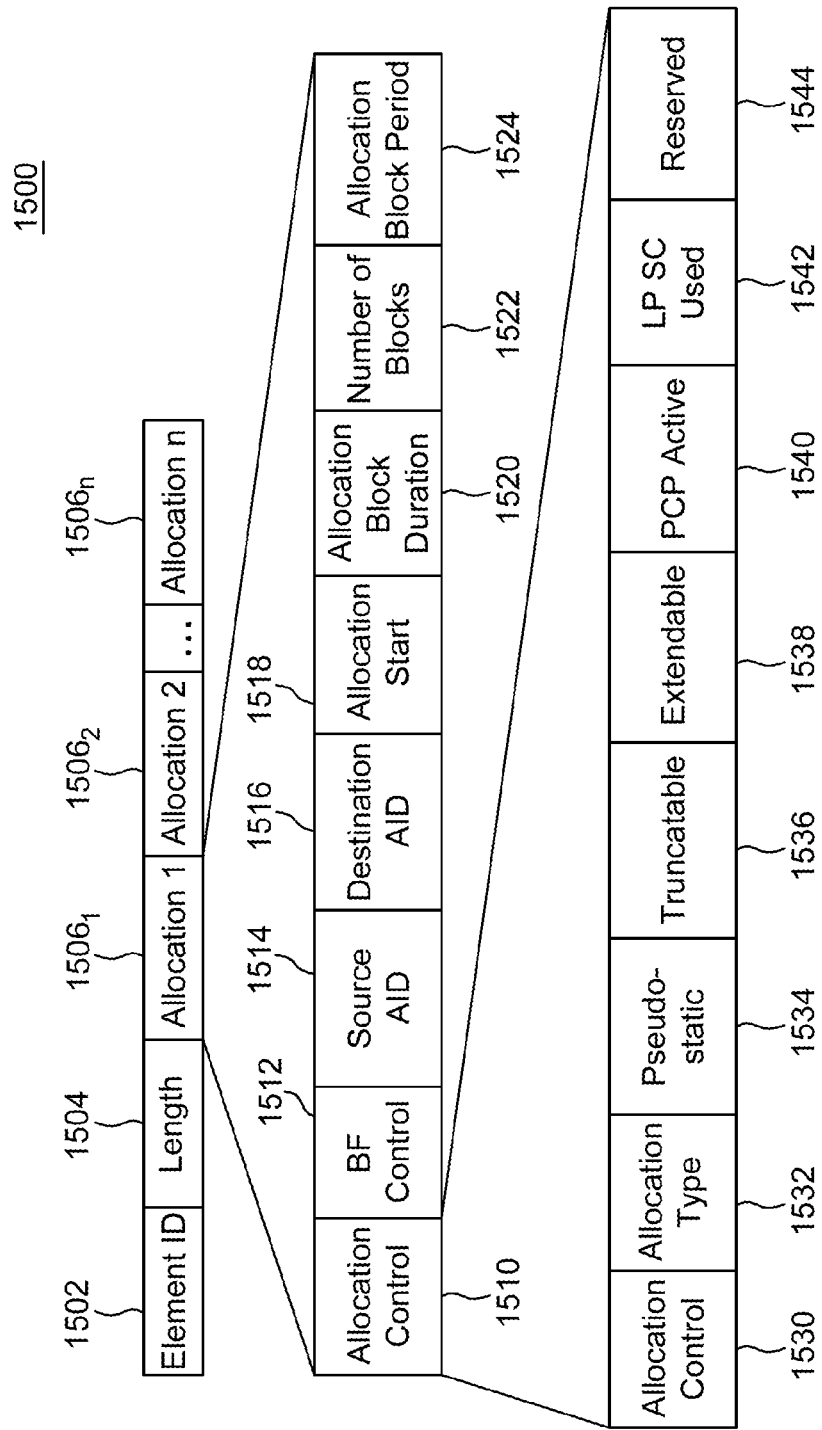
FIG. 15 is an example static allocation signaling element that includes multi-channel information.

FIG. 15 is an example static allocation signaling element (or frame) 1500 that includes multi-channel information. The static allocation signaling element 1500 may include, but is not limited to include, any one or more of the following fields: element ID field 1502; length field 1504; and/or allocation fields 1506₁ . . . 1606n for each individual SP/CBAP allocation (there are n SP/CBAP allocations in this example). Each allocation field 1506₁ . . . 1606n may include, but is not limited to include, any one or more of the following fields: allocation control field 1510; beamforming (BF) control field 1512; source AID field 1514; destination AID field 1516; allocation start time field 1518; allocation block duration field 1520; number of blocks field 1522; and/or allocation block period 1524. The allocation control field 1510 may include, but is not limited to include, any one or more of the following fields: allocation ID field 1530; allocation type field 1532; pseudo-static field 1534; truncate indicator field 1536; extendable indicator field 1538; PCP active field 1540 may indicate that the PCP is available to transmit or receive during the CBAP or SP; lower-power (LP) SC indicator field 1542 may be used to indicate that low-power SC mode is used (e.g., single bit); and/or a reserved field 1544.

In an example, any of the BF control field 1512, the allocation type field 1532, and/or the reserved field 1544, which may be not fully used in legacy systems, may be modified to carry more multi-channel related information, including, but not limited to, the following subfields (not shown): a MIMO field; CB/CA field; multi-user field; and/or a spatial sharing field. For example, the MIMO field may indicate whether MIMO transmission is allowed or not. The MIMO field may further include two subfields to indicate whether SU-MIMO and MU-MIMO are allowed. The MIMO transmission may be performed over the channel(s) indicated in a channel information field, or the MIMO field may indicate whether MIMO (or SU-MIMO and MU-MIMO) is allowed on each channel. The CB/CA field may indicate whether channel bonding and/or channel aggregation is allowed, and the multi-user field may indicate whether multi-user transmissions are allowed or not. In the case that an AGP may include one allocation, a common information field and an individual SP/CBAP information field may be used together to carry information for a single allocation.

The spatial sharing field may indicate whether a spatial sharing operation is allowed or not. Spatial sharing may be performed over the bonded/aggregated channels. The spatial sharing field may indicate whether spatial sharing is allowed on each channel. Spatial sharing may refer transmissions between two pairs of transmitters and receivers within one BSS or in different BSS (e.g., STA1 and STA2 may communicate using a SP or CBAP, while STA3 and STA4 may communicate and using the same time slot, where STA1, STA2, STA3 and STA4 may belong to one or more BSSs).

According to another example embodiment, in accordance with the disclosures herein, a backward compatible allocation signaling scheme may be used for multi-channel access and transmission. A dynamic allocation information field may be used to allocate channel access during scheduled SPs and CBAPs. For example, the dynamic allocation information field may be carried in a service period request (SPR) frame, a grant frame and/or any other type of control/management frames. In order to maintain backward compatibility, the multi-channel multi-user information, and/or MIMO information may be carried in a control trailer that may be appended at the end of the frame which carries the dynamic allocation information field.

Figure 16:
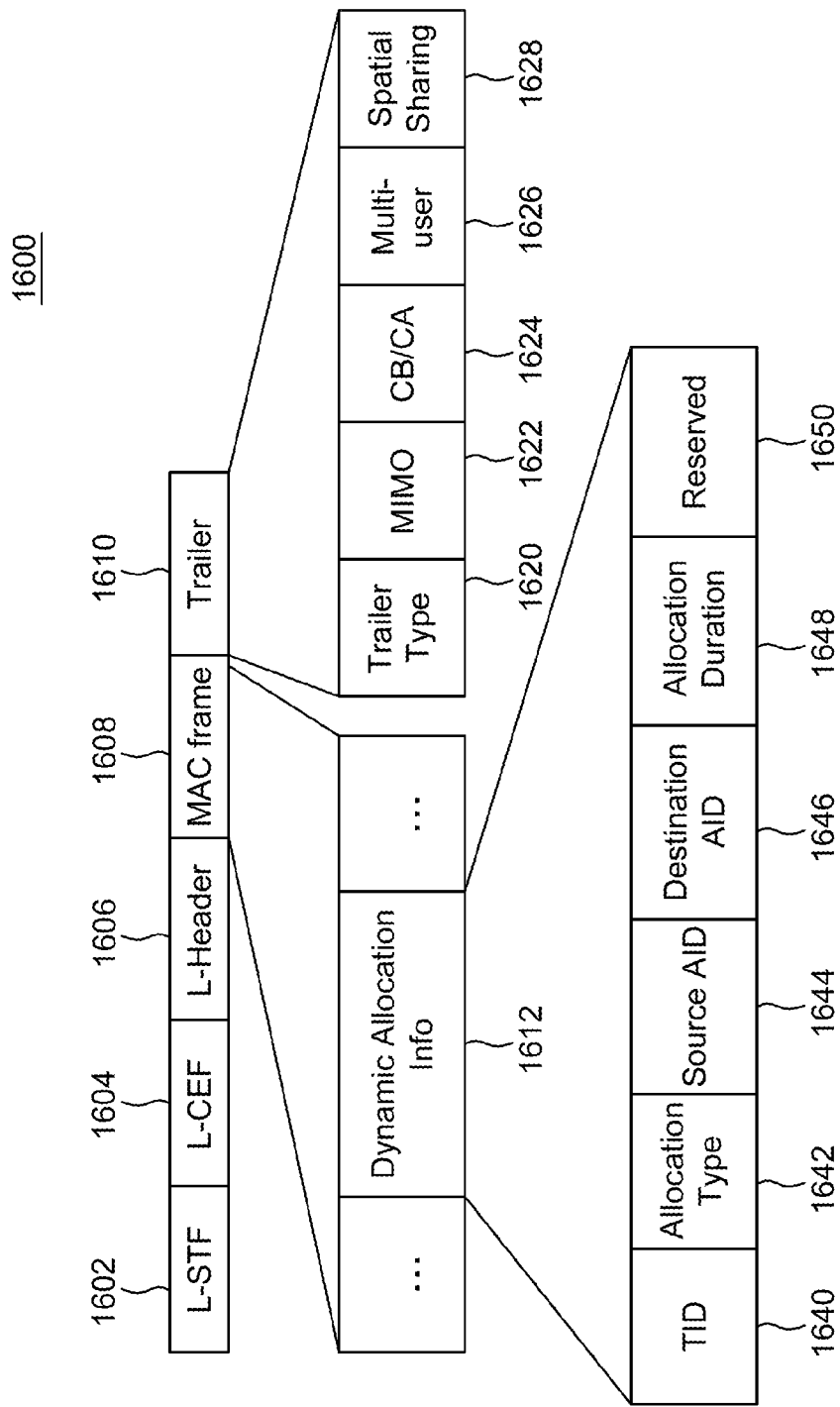
FIG. 16 is an example control frame carrying multi-channel multi-user related information.

FIG. 16 is an example control frame 1600 carrying multi-channel multi-user related information. The control frame 1600 may include, but is not limited to include, any one or more of the following elements (fields): L-STF 1602; L-CEF 1604; L-header field 1606; MAC frame 1608; and/or trailer 1610. The MAC frame 1608, which may be backwards compatible with older 802.11 releases, may include, in addition to standard or legacy MAC IEs (not shown), a dynamic allocation information field 1612. The dynamic allocation information field 1612 may include, but is not limited to include, any one or more of the following fields: traffic identifier (TID) field 1640; allocation type field 1642; source AID field 1644; destination AID field 1646; allocation duration field 1648; and/or reserved field 1650.

The control trailer 1610 may include more information about the allocation. For example, some bits of the reserved field 1650 in the dynamic allocation information field 1612 may be used to indicate that more allocation information is carried in the control trailer 1610. The control trailer field 1610 may include, but is not limited to, any one or more of the following fields: a trailer type field 1620; a MIMO field 1622; a CB/CA field 1624; a multi-user field 1626; and/or a spatial sharing field 1628. The trailer type field 1620 may indicate the type of the control trailer 1610. For example, the control trailer type may be an RTS/CTS extension, or a dynamic allocation extension.

The MIMO field 1622 may indicate whether MIMO transmission is allowed or not. The MIMO field 1622 may include two subfields (not shown) to indicate whether SU-MIMO and MU-MIMO are allowed. The MIMO transmission may be performed over the channel(s) indicated in a channel information field (not shown). The MIMO field 1622 may indicate whether MIMO (or SU-MIMO and/or MU-MIMO), is allowed on each channel. The CB/CA field 1624 may indicate whether channel bonding, and/or channel aggregation is allowed. The multi-user field 1626 may indicate whether multi-user transmission is allowed or not. The spatial sharing field 1628 may indicate whether a spatial sharing operation is allowed or not. The spatial sharing may be performed over the bonded/aggregated channels. The spatial sharing field 1628 may indicate whether spatial sharing is allowed on each channel. Spatial sharing may refer to transmissions between two pairs of transmitters and receivers within one BSS or in different BSS.

According to another example embodiment, in accordance with the disclosures herein, a multi-channel transmission setup frame may be used to setup the Tx/Rx beam pairs on multiple channels. In an example, the setup frame may be omitted when one or more of following conditions are met: the transmission is a single-user single data stream transmission using beams trained on a primary channel and/or a bonded/aggregated channel in which a transmitter and receiver may know the corresponding Tx/Rx beams (thus, setup may not be needed); and/or the transmission uses default Tx/Rx antenna beams and/or analog beams. In an example, the setup frame may be used when one or more of following conditions are met: more analog beams may be used in the multi-channel transmission; or multi-channel multi-user transmission may be performed, for example, in the case that an PCP/AP may transmit simultaneously to multiple users.

Figure 17:
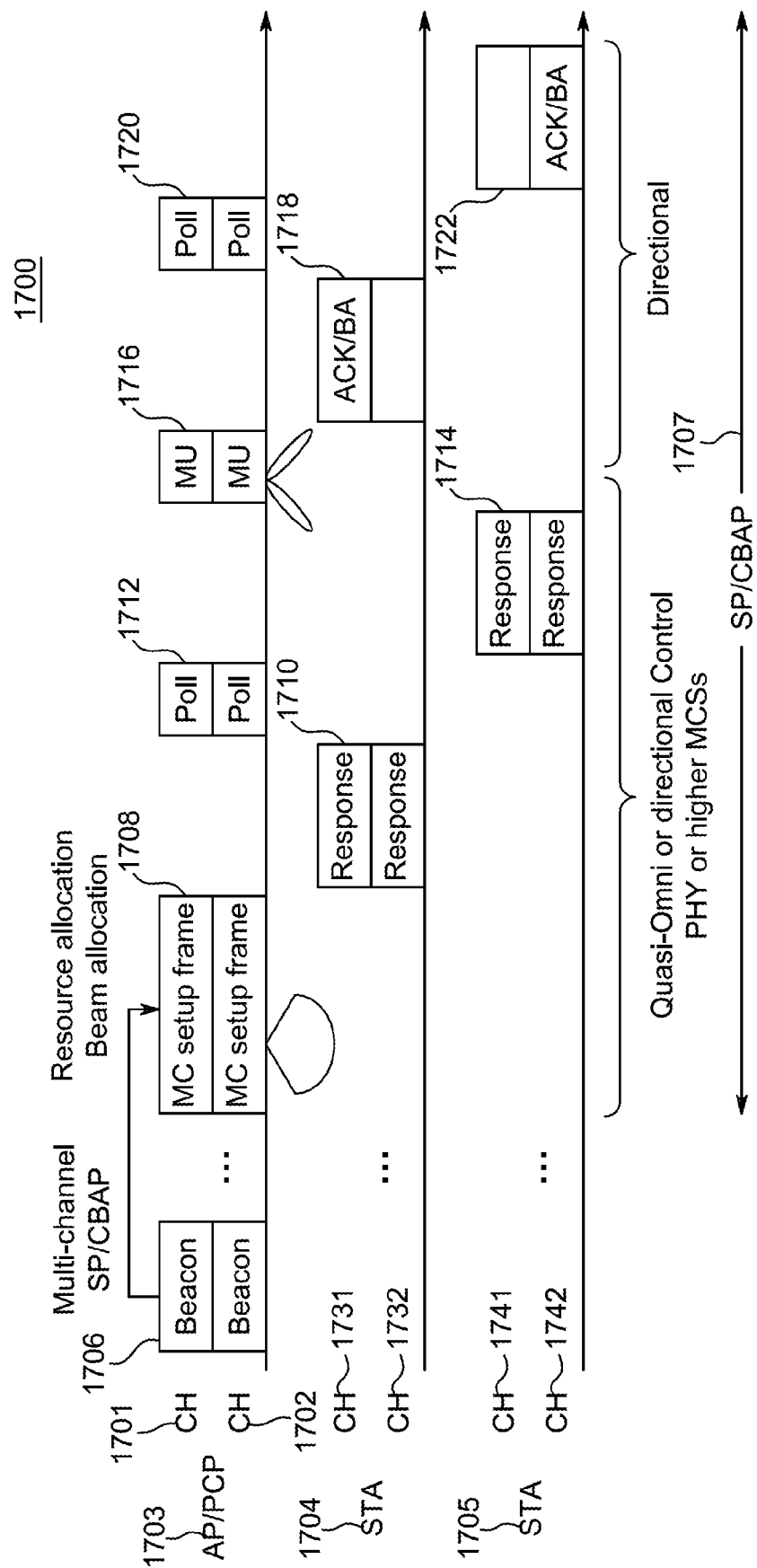
FIG. 17 is a signaling diagram of an example channel access procedure for multi-channel (MC) transmission using a MC setup frame.

FIG. 17 is a signaling diagram of an example channel access procedure 1700 for multi-channel (MC) transmission using a MC setup frame 1708. In this example, an AP/PCP 1703 communicates with STAs 1704 and 1705, which may be part of the same BSS. The AP/PCP 1703 may schedule one or more SPs and/or CBAPs for multi-channel transmission by including scheduling information in a beacon frame 1706 (e.g., sent on the primary channel 1701 only, or on all channels 1701 and 1702 using duplicated mode), for example to schedule SP/CBAP 1707. The AP/PCP 1703 may decide whether or not to transmit the MC setup frame 1708. If transmitted, the MC setup frame 1708 may be transmitted in the scheduled SP/CBAP 1710 (e.g., a first transmission in the SP/CBAP 1707). In the case that the MC setup frame 1708 is transmitted, the MC setup frame 1708 may include, but is not limited to include, any of the following fields (not shown): a frame purpose/type field, which may indicate that the frame 1708 is an MC setup frame; one or more receiving address (RA) fields (e.g., multiple RA fields may be used for the multi-user transmission case), such that in the case of multi-channel multi-user transmission, a broadcast or multicast address may be indicated by the RA field(s); and/or a user specific information field.

A user specific information field in the MC setup frame 1708 may include, but is not limited to include, any of the following fields (not shown): an AID field; an channel assignment field; an analog beam assignment field; and/or a digital/baseband precoding scheme field.

The AID field may indicate the AID or compressed/partial AID of the STA (user). The channel assignment field may indicate the channel assigned to the STA (user). A channel index may be used for the signaling, and/or the bonded/aggregated channels may be numbered in predetermined order and the numbering may be included in the signaling. For example, the bonded/aggregated channels may be numbered in descending or ascending order based on the central frequency or the channel index.

The user specific information field may include an analog beam assignment field including, for example, an antenna index, polarization information, and/or a beam/sector index, which may be used to uniquely define an analog beam on the assigned channel(s). In the case that more than one channel is assigned to a STA (user) and different beams may be applied to different channels, the analog beam assignment may carry beam/antenna/polarization etc. information for each channel.

The digital/baseband precoding scheme information may be used to specify detailed precoding scheme on the assigned channel(s). In the case that more than one channel is assigned to a STA (user), different precoding schemes may be allowed to be applied to different channel, and the digital/baseband precoding scheme information may accordingly be signaled per channel.

Intended STAs employing MC setup procedure and thus able to receive the MC setup frame 1708 may respond to the MC setup frame 1708 by sending response frames to the AP/PCP 1703. For example, two (or) more response frames 1710 may be transmitted concurrently by STA 1704 using different frequency channels 1731 and 1732, where the channels 1731 and 1732 may be assigned to STA 1704 by the AP/PCP 1703 in the MC setup frame 1708. Similarly, STA 1705 may send response frames 1714 concurrently over channels 1741 and 1742, where the channels 1741 and 1742 may be assigned to STA 1705 by the AP/PCP 1703 in the MC setup frame 1708. The channels 1731 and 1732 used by STA 1704 may be the same or different than the channels 1741 and 1742 used for STA 1705, such that any of the channels may be primary or secondary channels, and two or more channels may be combined using channel aggregation and/or channel bonding. In other examples, not shown, response frames may be sent concurrently using different spatial domain beams/weights, or sequentially in different time slots. A response frame 1710 and/or 1714 may be polled or scheduled; in the case with polling, a first response frame may be transmitted without polling. The transmission of response frames may be performed by quasi-omni transmission or directional transmission. In an example, the response frames may not be transmitted and may be omitted for overhead reduction.

MC setup frame 1708, poll frames 1712 and 1720, and ACK/BA frames 1718 and 1722 are control frames, which may be transmitted over a primary channel, an assigned channel, or combined channels using channel bonding/aggregation. The AP/PCP 1703 may perform MC transmission by transmitting MU frame 1716 after receiving the response frame(s) (e.g., response frames 1710 and/or 1714). The MU frame 1716 may be a data frame, and may be transmitted to STA 1704 on a channel (or combined channel) assigned to STA 1704, and to STA 1705 on a channel (or combined channel) assigned. The AP/PCP 1703 may wait an inter-frame space (xIFS) time duration after reception of the response frame 1710 before performing MC transmission. The MC transmission may be directional using the beams and precoding schemes set by the MC setup frame 1708. In the case where the response frame is omitted, the MC transmission may be performed xIFS time after the transmission of MC setup frame 1708. In the case the response frame is not omitted, the AP/PCP 1703 may not detect all of the response frames 1710 and 1714. In this case, the AP/PCP 1703 may transmit to the STAs 1704 and 1705 from which the response frame(s) 1710 and 1714 may be successfully detected or the AP/PCP 1703 may transmit a control frame (not shown) to terminate the SP/CBAP 1707.

Intended STAs 1704 and 1705 may send ACK/BA frames 1718 and 1722, respectively back to the AP/PCP 1703 to acknowledge successful reception of the MC transmission (s). The ACK/BA frames 1718 and 1722 may be transmitted using directional transmission. In an example, ACK/BA frames 1718 may be transmitted by STA 1704 concurrently using different frequency channels 1731 and 1732, where the channels 1731 and 1732 may be assigned by the AP/PCP 1703 in the MC setup frame 1708. In other examples, not shown, ACK/BA frames may be sent by STAs concurrently using different spatial domain beams/weights, or sequentially in a different time slots. An ACK/BA frame may be polled or scheduled; in the case of polling, the first ACK/BA frame may be transmitted without polling.

Figure 18:
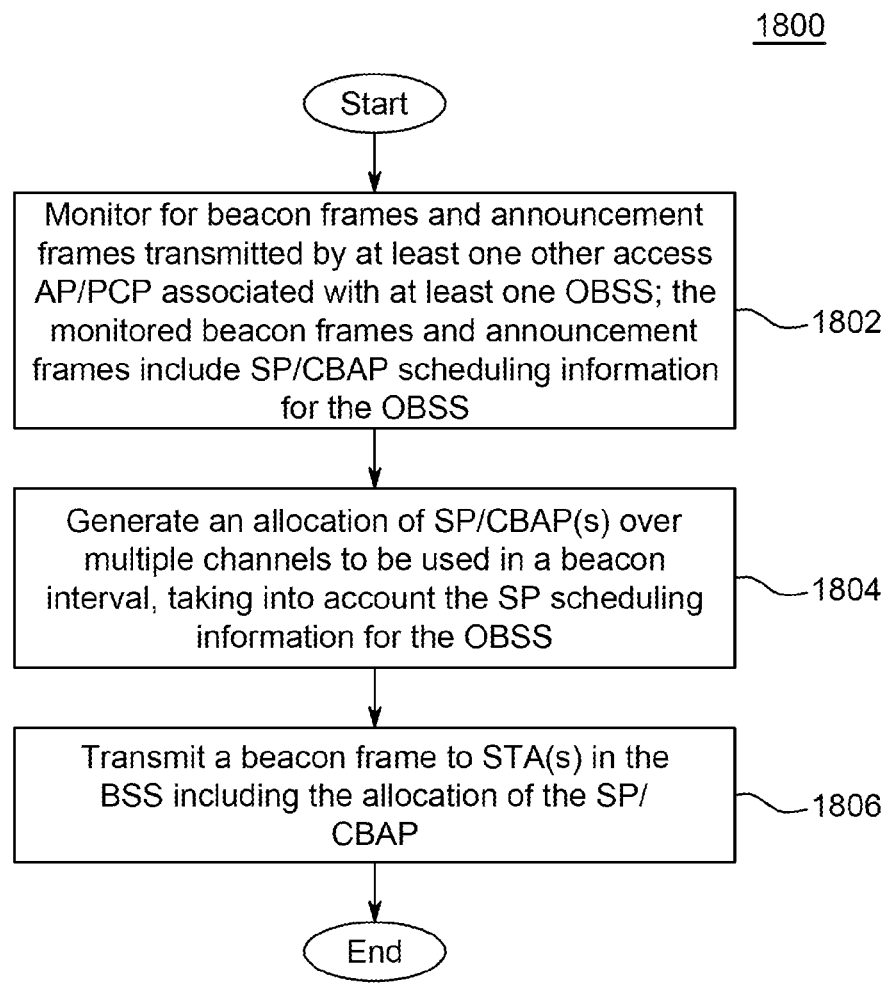
FIG. 18 is a flow diagram of an example multi-channel scheduling procedure for scheduling PSs/CBAPs performed by an AP/PCP.

FIG. 18 is a flow diagram of an example multi-channel scheduling (allocation) procedure 1800 for scheduling PSs/CBAPs performed by an AP/PCP. At 1802, the AP/PCP may monitor for beacon frames and announcement frames transmitted by at least one other access AP/PCP associated with at least one OBSS. The monitored beacon frames and announcement frames may include SP/CBAP scheduling information for the OBSS. At 1804, the AP/PCP may generate an allocation of SP/CBAP (one or more SPs/CBAPs) over multiple channels to be used in a beacon interval taking into account the SP scheduling information for the OBSS. At 1806, the AP/PCP may transmit a beacon frame (or announcement frame) to STA(s) (WTRUs) in its BSS including the allocation of the SP/CBAP.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. An access point (AP) that is part of a basic service set (BSS) and configured to provide multi-channel (MC) access to at least one station (STA) in the BSS, the AP comprising:
   a receiver configured to monitor for beacon frames transmitted by at least one other access point/personal basic service set (PBSS) control point (AP/PCP) associated with at least one overlapping basic service set (OBSS), wherein the beacon frames include at least service period (SP) scheduling information for the OBSS;
   a processor configured to generate an allocation of at least one SP associated with the BSS on at least two channels to be used in the BSS, to be used in a beacon interval, wherein the allocation of the at least one SP on the at least two channels is based on the SP scheduling information for the OBSS; and
   a transmitter configured to transmit a beacon frame to the at least one STA in the BSS, wherein the beacon frame includes the allocation of the at least one SP on the at least two channels and an indication of a number of allocations in the beacon frame.

2. The AP of claim 1, wherein, on a condition that the SP scheduling information for the OBSS indicates that a first channel is not interfered by transmissions in the OBSS, the allocation of the at least one SP on the at least two channels includes the first channel.

3. The AP of claim 1, wherein, on a condition that the SP scheduling information for the OBSS indicates that a first channel is interfered by transmissions in the OBSS in at least one time block, the allocation of the at least one SP on the at least two channels does not include the first channel in the at least one time block.

4. The AP of claim 1, wherein, on a condition that the SP scheduling information for the OBSS indicates that a first channel is being used for transmissions in the OBSS in at least one time block, the allocation of the at least one SP on the at least two channels includes the first channel and an indication that the first channel is used in the OBSS in the at least one time block.

5. The AP of claim 1, wherein the allocation of the at least one SP on the at least two channels further includes at least one of the following: a truncate indicator field to indicate whether the allocation is able to be truncated; an extendable indicator field to indicate whether the allocation is extendable; or an indicator field to indicate whether the allocation is dynamic.

6. The AP of claim 1, wherein:
   the processor is further configured to group a plurality of SPs with at least one common characteristic into a first allocation group period (AGP), wherein the allocation of the at least one SP on the at least two channels includes the first AGP.

7. The AP of claim 6, wherein the at least one common characteristic includes common channel bonding and channel aggregation (CB/CA) properties.

8. The AP of claim 6, wherein the allocation of the at least one SP on the at least two channels includes a common information part indicating the at least one common characteristic of the first AGP.

9. The AP of claim 8, wherein the common information part further indicates at least one of the following: channel bonding/channel aggregation (CB/CA) information, channel allocation information, multi-input multi-output (MIMO) information, spatial sharing information and beam forming training information.

10. The AP of claim 6, wherein the allocation of the at least one SP on the at least two channels includes an individual information part indicating at least one specific characteristic of a specific SP in the plurality of SPs.

11. A method, performed by an access point (AP) that is part of a basic service set (BSS), for providing multi-channel (MC) access to at least one station (STA) in the BSS, the method comprising:
monitoring for beacon frames transmitted by at least one other access point/personal basic service set (PBSS) control point (AP/PCP) associated with at least one overlapping basic service set (OBSS), wherein the beacon frames include at least service period (SP) scheduling information for the OBSS;
generating an allocation of at least one SP associated with the BSS on at least two channels to be used in the BSS, to be used in a beacon interval, wherein the allocation of the at least one SP on the at least two channels is based on the SP scheduling information for the OBSS; and
transmitting a beacon frame to the at least one STA in the BSS, wherein the beacon frame includes the allocation of the at least one SP on the at least two channels and an indication of a number of allocations in the beacon frame.

12. The method of claim 11, wherein, on a condition that the SP scheduling information for the OBSS indicates that a first channel is not interfered by transmissions in the OBSS, the allocation of the at least one SP on the at least two channels includes the first channel.

13. The method of claim 11, wherein, on a condition that the SP scheduling information for the OBSS indicates that a first channel is interfered by transmissions in the OBSS in at least one time block, the allocation of the at least one SP on the at least two channels does not include the first channel in the at least one time block.

14. The method of claim 11, wherein, on a condition that the SP scheduling information for the OBSS indicates that a first channel is being used for transmissions in the OBSS in at least one time block, the allocation of the at least one SP on the at least two channels includes the first channel and an indication that the first channel is used in the OBSS in the at least one time block.

15. The method of claim 11, wherein the allocation of the at least one SP on the at least two channels further includes at least one of the following: a truncate indicator field to indicate whether the allocation is able to be truncated; an extendable indicator field to indicate whether the allocation is extendable; or an indicator field to indicate whether the allocation is dynamic.

16. The method of claim 11, further comprising:
grouping a plurality of SPs with at least one common characteristic into a first allocation group period (AGP), wherein the allocation of the at least one SP on the at least two channels includes the first AGP.

17. The method of claim 16, wherein the at least one common characteristic includes common channel bonding and channel aggregation (CB/CA) properties.

18. The method of claim 16, wherein the allocation of the at least one SP on the at least two channels includes a common information part indicating the at least one common characteristic of the first AGP.

19. The method of claim 18, wherein the common information part further indicates at least one of the following: channel bonding/channel aggregation (CB/CA) information, channel allocation information, multi-input multi-output (MIMO) information, spatial sharing information and beam forming training information.

20. The method of claim 16, wherein the allocation of the at least one SP on the at least two channels includes an individual information part indicating at least one specific characteristic of a specific SP in the plurality of SPs.

* * * * *